US012469951B2

(12) United States Patent
Kim et al.

(10) Patent No.: US 12,469,951 B2
(45) Date of Patent: Nov. 11, 2025

(54) ANTENNA AND VEHICLE

(71) Applicants: LG ELECTRONICS INC., Seoul (KR); KOREA ADVANCED INSTITUTE OF SCIENCE AND TECHNOLOGY, Daejeon (KR)

(72) Inventors: Dongjin Kim, Seoul (KR); Kangjae Jung, Seoul (KR); Jong-Won Yu, Daejeon (KR); Seong-Jin Kim, Daejeon (KR); Jeong-Wook Kim, Daejeon (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/832,065

(22) PCT Filed: Oct. 26, 2022

(86) PCT No.: PCT/KR2022/016449
§ 371 (c)(1),
(2) Date: Jul. 22, 2024

(87) PCT Pub. No.: WO2024/090603
PCT Pub. Date: May 2, 2024

(65) Prior Publication Data
US 2025/0167423 A1 May 22, 2025

(51) Int. Cl.
*H01Q 1/12* (2006.01)
*H01Q 1/48* (2006.01)
*H01Q 5/335* (2015.01)

(52) U.S. Cl.
CPC ............. *H01Q 1/1271* (2013.01); *H01Q 1/48* (2013.01); *H01Q 5/335* (2015.01)

(58) Field of Classification Search
CPC .......... H01Q 1/1271; H01Q 1/24; H01Q 1/32; H01Q 1/38–48; H01Q 5/30–50
See application file for complete search history.

(56) References Cited

U.S. PATENT DOCUMENTS

| | | | | |
|---|---|---|---|---|
| 11,984,673 B2 * | 5/2024 | Koo | .......................... | H01Q 9/40 |
| 2011/0115687 A1 * | 5/2011 | Huang | ...................... | H01Q 9/42 343/843 |

(Continued)

FOREIGN PATENT DOCUMENTS

| | | |
|---|---|---|
| JP | 2010-525647 | 7/2010 |
| JP | 4704973 | 6/2011 |

(Continued)

OTHER PUBLICATIONS

PCT International Application No. PCT/KR2022/016449, International Search Report dated Jul. 25, 2023, 15 pages.

*Primary Examiner* — Hasan Islam
(74) *Attorney, Agent, or Firm* — LEE, HONG, DEGERMAN, KANG & WAIMEY

(57) ABSTRACT

According to embodiments, provided is an antenna comprising: a substrate of a square shape including first to fourth corners; a radiation unit disposed on the substrate and including a first radiation unit and a second radiation unit that radiate a wireless signal; a first feed line that applies the wireless signal to the first radiation unit; a second feed line that applies the wireless signal to the second radiation unit and has an extension line that perpendicularly intersects with an extension line of the first feed line; and a ground portion disposed on the substrate and spaced apart from the radiation unit and having at least a portion of a boundary area including a step shape, wherein the ground unit includes a shared ground unit that is disposed diagonally from a first edge to a third edge, is located between the first radiation unit and the second radiation unit, and performs impedance matching of the first radiation unit and the second radiation unit.

9 Claims, 25 Drawing Sheets

(56) References Cited

U.S. PATENT DOCUMENTS

2024/0235014 A1* 7/2024 Shoji .......................... H01Q 1/22
2025/0038410 A1* 1/2025 Kwak .................... H01Q 1/243

FOREIGN PATENT DOCUMENTS

KR 10-1871695 8/2018
KR 10-2100626 4/2020
KR 10-2022-0123133 9/2022

* cited by examiner

SUV (a)

Compact car (b)

Sedan (c)

(a)

(b)

(a)

(b)

(a)

(b)

(a)

(b)

(a)

(b)

ANTENNA AND VEHICLE

CROSS-REFERENCE TO RELATED APPLICATION(S)

This application is the National Stage filing under 35 U.S.C. 371 of International Application No. PCT/KR2022/016449, filed on Oct. 26, 2022, the contents of which is hereby incorporated by reference herein in its entirety.

TECHNICAL FIELD

Embodiments relate to an antenna and/or a vehicle. For example, embodiments are applied to a vehicle wideband antenna and/or a vehicle including the same.

BACKGROUND ART

A vehicle may perform a wireless communication service with another vehicle or a neighboring object, an infrastructure, or a base station. In this regard, various communication services may be provided through a wireless communication system to which an LTE or 5G communication technology is applied. Meanwhile, a part of an LTE frequency band may be allocated to provide a 5G communication service.

In this case, there is a problem in that a vehicle body and a vehicle roof are formed of a metal material to block radio waves. Accordingly, a separate antenna structure may be disposed at an upper portion of the vehicle body or roof. Alternatively, when the antenna structure is disposed at a lower portion of the vehicle body or roof, the vehicle body or roof portion corresponding to an antenna disposed area may be formed of a non-metallic material.

However, in terms of design, the vehicle body or roof needs to be integrally formed. In this case, an exterior of the vehicle body or roof may be formed of a metal material. Accordingly, there is a problem that antenna efficiency may be greatly reduced due to the vehicle body or roof.

In this regard, a transparent antenna may be disposed on a glass corresponding to a window of a vehicle to increase the communication capacity without changing an exterior design of the vehicle. However, there is a problem that antenna radiation efficiency and impedance bandwidth characteristics are deteriorated due to the electrical loss of the transparent material antenna.

In this case, an antenna layer on which an antenna pattern is disposed and a ground layer on which a ground pattern is disposed may be disposed on different planes, respectively. For example, in the case of operating as a wideband antenna, the thickness between the antenna layer and the ground layer needs to be increased.

However, considering both design and functional aspects, it is required that a transparent antenna layer and a ground layer for a vehicle should be disposed on the same layer. In this case, there is a problem that an antenna fails to meet the required thickness, and thus it is difficult to operate as a wideband antenna.

On the other hand, even when such a wideband antenna is implemented as a transparent antenna for a vehicle, it is required to provide Multiple-Input and Multiple-Output (MIMO) through a plurality of antenna elements. In addition, an antenna module disposed in a vehicle is required to maintain high antenna performance even in a LowBand (LB) of, for example, 1 GHz or less among all bands of 4G/5G communication. However, in a low band, considering an operating bandwidth based on a center frequency, there is a problem that it is required to operate in a band more wideband than other bands.

DISCLOSURE

Technical Tasks

One technical task of embodiments is to provide an antenna and a vehicle including the same for solving the above-described problems.

Another technical task of embodiments is to provide an antenna and/or a vehicle including the same that present a structure in which a plurality of antenna elements are optimally disposed within a limited space of a vehicle glass.

Another technical task of embodiments is to provide an antenna and/or a vehicle including an antenna with a minimized size of an antenna module.

Another technical task of embodiments is to provide an antenna in which an antenna module disposed in a vehicle is implemented in the full band and/or a vehicle including the same.

Further technical task of embodiments is to provide an antenna that outputs more than a predetermined performance despite a loss due to a transparent material or a glass material based on disposing the antenna on a vehicle window and/or a vehicle including the same.

Technical tasks to be achieved in the embodiments are not limited to the above-mentioned matters, and other unmentioned technical tasks may be considered by those skilled in the art from various embodiments to be described below.

Technical Solutions

In one technical aspect of the present disclosure, provided is an antenna including a substrate having a square shape including first to fourth corners, a radiating part disposed on the substrate and including a first radiating part and a second radiating part for radiating a wireless signal, a first feeding line for applying the wireless signal to the first radiating part, a second feeding line for applying the wireless signal to the second radiating part and having an extension line vertically intersecting with that of the first feeding line, and a ground part disposed on the substrate by being spaced apart from the radiating part and having at least a portion of a boundary area in a stair shape, the ground part comprising a shared ground part disposed along a diagonal from the first corner to the third corner, located between the first radiating part and the second radiating part, and performing impedance matching of the first radiating part and the second radiating part.

The substrate may have the square shape including the first to fourth corners and the antenna may be formed in a symmetrical structure with respect to the diagonal from the first corner toward the third corner facing the first corner.

A boundary area of the shared ground part may include first to third points formed along one surface located on a side facing the first radiating part, the first point may be closer to the first corner than the second point, the second point may be closer to the first corner than the third point, a first distance being a vertical distance from the first point to the first radiating part may be shorter than a second distance being a vertical distance from the second point to the first radiating part, and the second distance may be shorter than a third distance being a vertical distance from the third point to the first radiating part.

The ground part may further include a first ground part disposed adjacent to the first radiating part and performing the impedance matching of the first radiating part and a second ground part disposed adjacent to the second radiating part and performing the impedance matching of the second radiating part.

The radiating part may include one or more protrusions in a boundary area.

The first feeding line may include a first connection line connected to the first radiating part, the second feeding line may include a second connection line connected to the second radiating part, the first radiating part may be formed in an asymmetrical structure with respect to an extension line of the first connection line, and the second radiating part may be formed in an asymmetric structure with respect to an extension line of the second connection line.

A length of each of the first feeding line and the second feeding line may be equal to or smaller than a preset length.

In another technical aspect of the present disclosure, provided is a vehicle including a glass constituting a window and an antenna formed on the glass, the antenna including a substrate having a square shape including first to fourth corners, a radiating part disposed on the substrate and including a first radiating part and a second radiating part for radiating a wireless signal, a first feeding line for applying the wireless signal to the first radiating part, a second feeding line for applying the wireless signal to the second radiating part and having an extension line vertically intersecting with that of the first feeding line, and a ground part disposed on the substrate by being spaced apart from the radiating part and having at least a portion of a boundary area in a stair shape, the ground part comprising a shared ground part disposed along a diagonal from the first corner to the third corner, located between the first radiating part and the second radiating part, and performing impedance matching of the first radiating part and the second radiating part.

The vehicle may further include a frame supporting the glass, and at least one side of the antenna may be spaced apart from the frame by a preset distance.

Advantageous Effects

Embodiments may present an antenna having high performance and/or a vehicle including the antenna.

Embodiments may minimize a size of an antenna module so that the antenna module may be disposed within a limited area of a vehicle window.

Embodiments may maintain high antenna performance in a low band as well as in a wide band.

Embodiments may provide an antenna with improved radiation efficiency.

Embodiments may provide an antenna with improved radiation efficiency bandwidth.

Embodiments may provide an antenna with an improved impedance bandwidth.

Effects obtainable from the present disclosure are not limited by the above mentioned effects, and other unmentioned effects can be clearly understood from the above description by those having ordinary skill in the technical field to which the present disclosure pertains.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

BEST MODE

Figure 1:
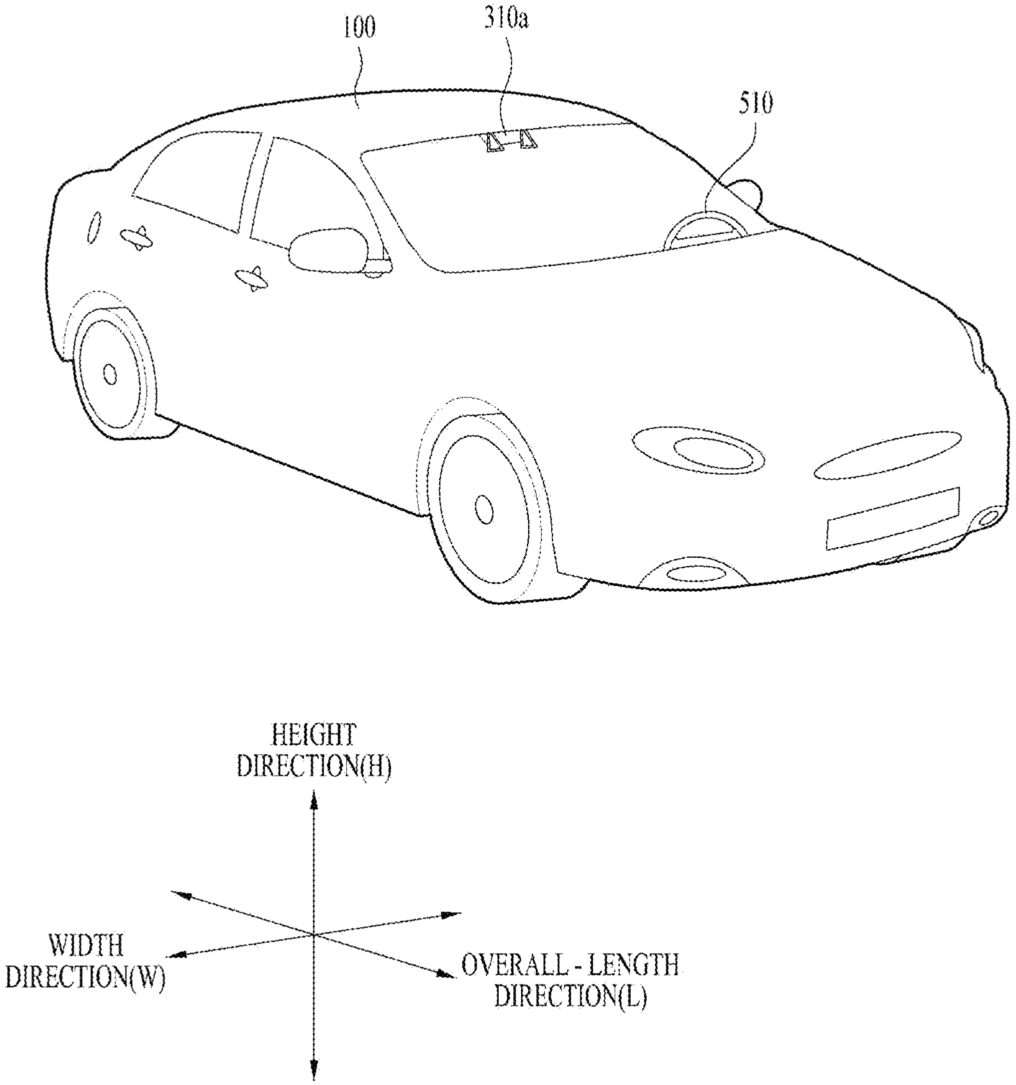
FIG. 1 is a diagram illustrating an example of the external appearance of a vehicle according to an implementation of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another. It will be understood that when an element is referred to as being "connected with" another element, the element can be directly connected with the other element or intervening elements may also be present.

In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A vehicle described in the present specification is driven for the purpose of transporting a person or cargo, and is a device that operates using power. Vehicles may include, for example, an automobile and a motorcycle. Hereinafter, a car will be mainly described for the vehicle. Vehicles include an internal combustion engine vehicle having an engine as a power source, a hybrid vehicle having an engine and an electric motor as power sources, and an electric vehicle having an electric motor as a power source.

A vehicle includes one or more windows. The window includes a transparent glass such as a glass.

Also, an antenna described in the present specification may be applied to a window provided in a vehicle. However, the usage of the antenna according to embodiments is not limited thereto. The antenna according to the embodiments may be applied to all objects that communicate with the outside by efficiently utilizing a limited space, such as glass provided in a vehicle. Also, the antenna according to the embodiments may be applied to all objects that are required to be implemented on a transparent material, such as glass provided in a vehicle. In this case, the antenna is a wireless communication device for transmitting/receiving data to with/from the outside. The antenna is a device that transmits/receives radio waves (electromagnetic waves) to/from a space for efficient communication, for example.

Meanwhile, the description of an example of a communication system described in the present specification is as follows.

<V2X (Vehicle-to-Everything)>

V2X communication includes communications between vehicles and all entities, such as Vehicle-to-Vehicle (V2V) referring to communication between vehicles, Vehicle-to-Infrastructure (V2I) referring to communication between a vehicle and an eNB or a Road Side Unit (RSU), Vehicle-to-Pedestrian (V2P) referring to between a vehicle and an individual (e.g., a pedestrian, a cyclist, a driver, or a passenger, and Vehicle-to-Network (V2N), etc.

V2X communication may refer to the same meaning as V2X sidelink or NR V2X, or may refer to a broader meaning including V2X sidelink or NR V2X.

V2X communication is applicable to various services, such as forward collision warning, automated parking system, Cooperative Adaptive Cruise Control (CACC), control loss warning, traffic procession warning, traffic vulnerable safety warning, emergency vehicle warning, speed warning on curved road driving, traffic flow control, etc.

V2X communication may be provided through PC5 interface and/or Uu interface. In this case, in a wireless communication system supportive of V2X communication, specific network entities for supporting communication between the vehicle and all entities may exist. For example, the network entities may include a base station (eNB), a Road Side Unit (RSU), a User Equipment (UE), an application server (e.g., a traffic safety server), etc.

In addition, a UE that performs V2X communication may mean not only a general handheld UE but also a Vehicle UE (V-UE), a pedestrian UE, an RSU of a base station (eNB) type, or an RSU of a UE type, a robot equipped with a communication module, etc.

V2X communication may be performed directly between UEs or through the network entity(s). A V2X operation mode may be classified according to a way of performing such V2X communication.

Terms used in V2X communication are defined as follows.

A Road Side Unit (RSU): An RSU (Road Side Unit) is a V2X serviceable device that can transmit and receive mobile vehicles using a V2I service. In addition, the RSU is a fixed infrastructure entity that supports V2X applications and can exchange messages with other entities that support V2X applications. The RSU is a term often used in the existing ITS specifications, and the reason why this term is introduced in the 3GPP specification is to make documents easier to read in the ITS industry. The RSU is a logical entity that combines a V2X application logic with the function of an eNB (called an eNB-type RSU) or a UE (called a UE-type RSU).

A V2I service is a type of V2X service, one side of which is a vehicle and the other side of which is an entity belonging to infrastructure. A V2P service is a V2X service type, one side of which is a vehicle and the other side of which is a device carried by an individual (e.g., a portable UE carried by a pedestrian, a cyclist, a driver, or a passenger). The V2X Service is a 3GPP communication service type in which a transmission or reception device is related to a vehicle. It may be further divided into a V2V service, a V2I service, and a V2P service depending on a counterpart participating in communication.

A V2X enabled UE is a UE that supports a V2X service. A V2V service is a type of V2X service, and both sides of communication are vehicles. A V2V communication range is a direct communication range between two vehicles participating in the V2V service.

As described above, V2X applications called V2X (Vehicle-to-Everything) have four types: (1) Vehicle-to-Vehicle (V2V), (2) Vehicle-to-Infrastructure (V2I), (3) Vehicle-to-Network (V2N), and (4) Vehicle-to-Pedestrian (V2P). For example, the four types of V2X applications may use "co-operative awareness" that provides more intelligent services for end users. This means that entities such as vehicles, roadside infrastructure, application servers, and pedestrians may collect knowledge about their local environment (e.g., information received from other close vehicles or sensor equipment) to process and share the corresponding knowledge in order to provide more intelligent information such as cooperative collision warnings or autonomous driving.

<NR V2X>

In order to expand the 3GPP platform to the automobile industry during 3GPP releases 14 and 15, support for V2V and V2X services in LTE has been introduced. The requirements for supporting the enhanced V2X use case are largely organized into four use case groups.

(1) Vehicle platooning allows vehicles to dynamically form a platoon to move together. All vehicles in a platoon take information from a leading vehicle to manage the platoon. This information allows a vehicle to drive more harmoniously than in the normal direction, to go in the same direction and run together.

(2) Extended sensors enable the exchange of raw or processed data collected through local sensors or live video images on vehicles, road site units, pedestrian devices, and V2X application servers. A vehicle may raise environmental awareness beyond what its sensors can detect, and get a broader and holistic view of local conditions. One of the main features is a high data transmission rate.

(3) Advanced driving enables semi-autonomous or fully-autonomous driving. Each vehicle and/or RSU shares self-recognition data obtained from a local sensor with a close vehicle, and allows the vehicle to synchronize and adjust trajectory or maneuver. Each vehicle shares a driving intention with a close driving vehicle.

(4) Remote driving allows a remote driver or a V2X application program to self-drive a remote vehicle or drive a remote vehicle for a passenger who is unable to drive the remote vehicle in a dangerous environment. If variation is limited and a route is predictable, such as public transportation, driving based on cloud computing may be used. High reliability and low latency are the main requirements.

The following description is applicable to both NR Side-Link (SL) and LTE SL. When Radio Access Technology (RAT) is not indicated, it may mean NR SL. There may be six operational scenarios considered in NR V2X as follows. In this regard, FIG. 2B shows a standalone scenario supporting V2X SL communication and an MR-DC scenario supporting V2X SL communication.

In particular, 1) in scenario 1, a gNB provides a control/configuration for V2X communication of a UE in both LTE SL and NR SL. 2) In scenario 2, an ng-eNB provides a control/configuration for V2X communication of a UE in both LTE SL and NR SL. 3) In scenario 3, an eNB provides a control/configuration for V2X communication of a UE in both LTE SL and NR SL. Meanwhile, 4) in scenario 4, V2X communication of a UE in LTE SL and NR SL is controlled/configured by a Uu while the UE is configured as an EN-DC. 5) In scenario 5, V2X communication of a UE in LTE SL and NR SL is controlled/configured by a Uu while the UE is configured in an NE-DC. Also, 6) in scenario 6, V2X communication of a UE in LTE SL and NR SL is controlled/configured by a Uu while the UE is configured as an NGEN-DC.

Meanwhile, the description of an example of a communication system described in the present specification is as follows.

<V2X (Vehicle-to-Everything)>

V2X communication includes communication between a vehicle and all entities, such as Vehicle-to-Vehicle (V2V), which refers to communication between vehicles, Vehicle to Infrastructure (V2I), which refers to communication between a vehicle and an eNB or Road Side Unit (RSU), Vehicle-to-Pedestrian (V2P), which refers to communication between a vehicle and a UE carried by an individual (e.g., pedestrian, cyclist, vehicle driver, or passenger), and Vehicle-to-Network (V2N).

V2X communication may refer to the same meaning as V2X sidelink or NR V2X, or may refer to a broader meaning including V2X sidelink or NR V2X.

V2X communication is applicable to various services, such as forward collision warning, automated parking system, Cooperative Adaptive Cruise Control (CACC), control loss warning, traffic procession warning, traffic vulnerable safety warning, emergency vehicle warning, speed warning on a curved road driving, traffic flow control, etc.

V2X communication may be provided through a PC5 interface and/or a Uu interface. In this case, in a wireless communication system supporting V2X communication, specific network entities for supporting communication between the vehicle and all entities may exist. For example, the network entities may include a base station (eNB), a Road Side Unit (RSU), a UE, an application server (e.g., a traffic safety server), etc.

In addition, a UE performing V2X communication may mean a Vehicle UE (V-UE), a pedestrian UE, an RSU of a base station type (eNB type), an RSU of a UE type, a robot equipped with a communication module, or the like as well as a general handheld UE.

V2X communication may be performed directly between UEs or through the network entity(s). A V2X operation mode may be classified according to a way of performing the V2X communication.

Terms used in V2X communication are defined as follows.

A Road Side Unit (RSU): An RSU (Road Side Unit) is a V2X serviceable device capable of performing transmission and reception with a moving vehicle using a V2I service. In addition, the RSU is a fixed infrastructure entity that supports V2X applications and may exchange messages with other entities that support V2X application programs. The RSU is a term often used in the existing ITS specifications, and the reason why this term is introduced in the 3GPP specification is to make documents easier to read in the ITS industry. The RSU is a logical entity that combines a V2X application logic with a function of an eNB (called an eNB-type RSU) or a UE (called a UE-type RSU).

A V2I service is a type of V2X service, one side of which is a vehicle and the other of which is an entity belonging to infrastructure. A V2P service is also a type of V2X service, one side of which is a vehicle and the other side of which is a device carried by an individual (e.g., a pedestrian, a cyclist, a driver, or a passenger). the V2X service is a type of 3GPP communication service in which a transmission or reception device is related to a vehicle. It may be further divided into a V2V service, a V2I service, or a V2P service according to a counterpart participating in communication.

A V2X enabled UE is a UE that supports a V2X service. A V2V service is a type of V2X service, and both sides of communication are vehicles. A V2V communication range is a direct communication range between two vehicles participating in the V2V service.

As mentioned above, V2X applications called V2X (Vehicle-to-Everything) have four types: (1) Vehicle-to-Vehicle (V2V), (2) Vehicle-to-Infrastructure (V2I), (3) Vehicle-to-Network (V2N), and (4) Vehicle-to-Pedestrian (V2P). For example, four types of V2X applications may use "co-operative awareness" that provides more intelligent services for end users. This means that entities such as vehicles, roadside infrastructure, application servers, and pedestrians may collect knowledge about their local environment (e.g., information received from other close vehicles or sensor equipment) to process and share the corresponding knowledge in order to provide more intelligent information such as cooperative collision warnings or autonomous driving.

<NR V2X>

In order to expand the 3GPP platform to the automobile industry during 3GPP releases 14 and 15, support for V2V and V2X services in LTE was introduced. The requirements for supporting the enhanced V2X use case are largely organized into four use case groups.

(1) Vehicle platooning allows vehicles to move together while dynamically forming a platoon. All vehicles in a platoon take information from a leading vehicle to manage the platoon. This information allows vehicles to drive more harmoniously than in a normal direction and to go in the same direction and run together.

(2) Extended sensors enable the exchange of raw or processed data collected through local sensors or live video images from vehicles, road site units, pedestrian devices, and V2X application servers. A vehicle may raise environmental awareness beyond what sensors of the vehicle can detect, and get a broader and holistic view of local situations. One of the main features is a high data transmission rate.

(3) Advanced driving enables semi- or fully-autonomous driving. Each vehicle and/or RSU shares self-recognition data obtained from a local sensor with a close vehicle, and allows the vehicle to synchronize and adjust the trajectory or maneuver. Each vehicle shares a driving intention with a close driving vehicle.

(4) Remote driving allows a remote driver or V2X application to drive a remote vehicle on its own or for a passenger who is unable to drive the remote vehicle in a dangerous environment. If fluctuation is limited and a route is predictable like public transportation, driving based on cloud computing may be used. High reliability and low latency are the main requirements.

The following description is applicable to both NR SL (sidelink) and LTE SL, and when Radio Access Technology (RAT) is not displayed, it may mean NR SL. There may be six operational scenarios considered in NR V2X as follows. In this regard, FIG. 2B shows a standalone scenario supporting V2X SL communication and an MR-DC scenario supporting V2X SL communication.

In particular, 1) in scenario 1, a gNB provides a control/configuration for V2X communication of a UE in both LTE SL and NR SL. 2) In scenario 2, an ng-eNB provides a control/configuration for V2X communication of a UE in both LTE SL and NR SL. 3) In scenario 3, an eNB provides a control/configuration for V2X communication of a UE in both LTE SL and NR SL. Meanwhile, in scenario 4), V2X communication of a UE in LTE SL and NR SL is controlled/configured by a Uu while the UE is configured as an EN-DC. 5) In scenario 5, V2X communication of a UE in LTE SL and NR SL is controlled/configured by a Uu while the UE is configured in an NE-DC. Also, in scenario 6, V2X communication of a UE in LTE SL and NR SL is controlled/configured by a Uu while the UE is configured as an NGEN-DC.

FIG. 1 is a view of the external appearance of a vehicle according to an implementation of the present disclosure.

Figure 2:
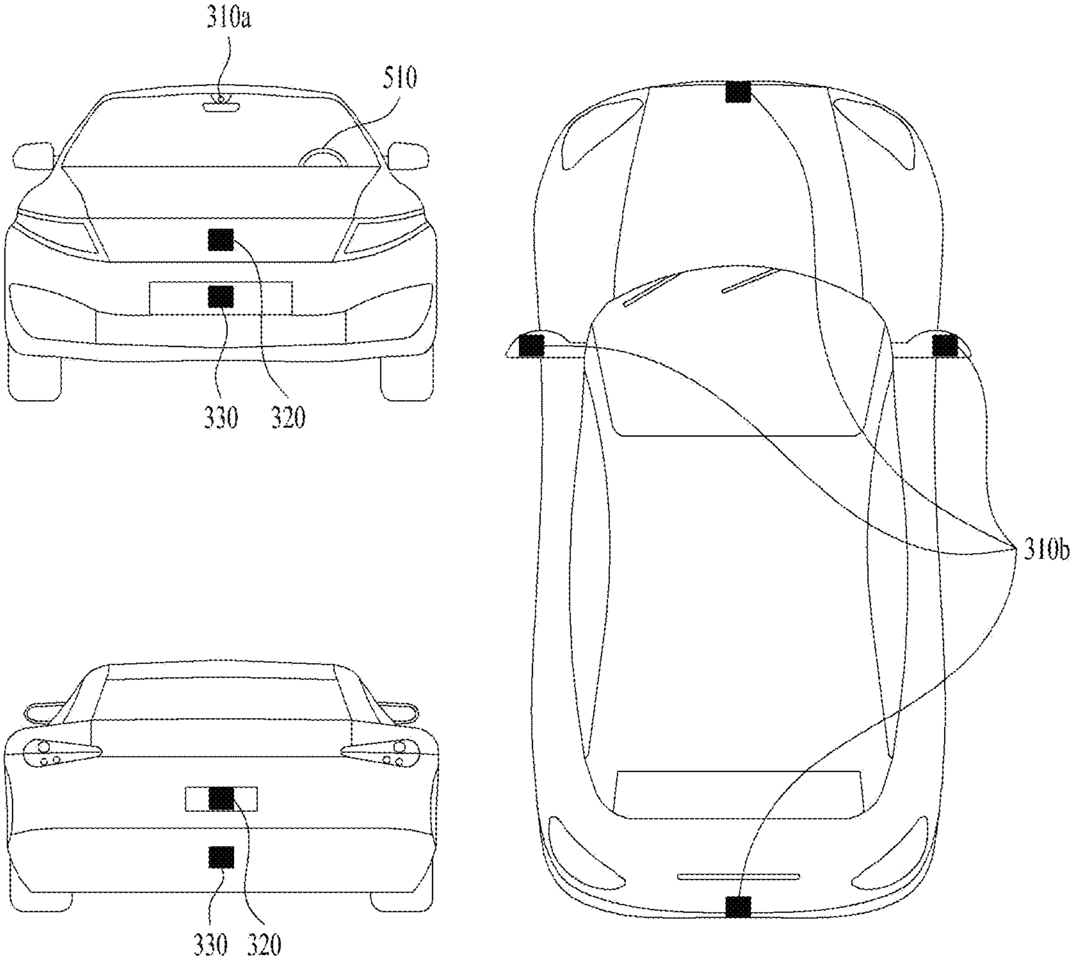
FIG. 2 is a diagram illustrating examples of different angled views of the external appearance of a vehicle according to an implementation of the present disclosure.

FIG. 2 is different angled views of a vehicle according to an implementation of the present disclosure.

Figure 3:
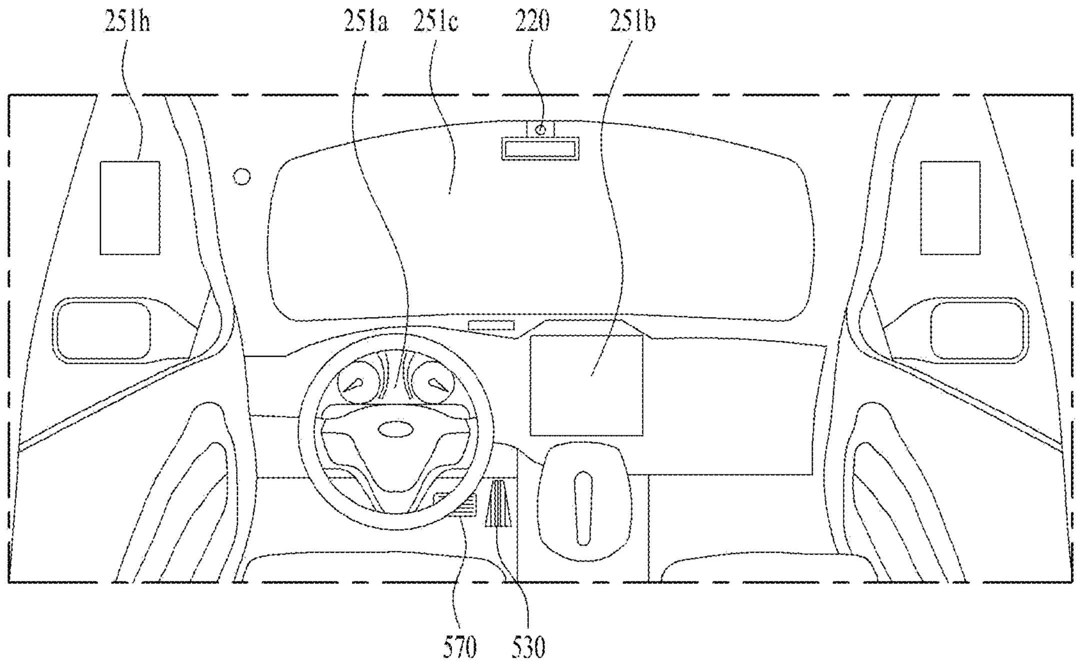
FIGS. 3 and 4 are diagrams illustrating examples of the interior configuration of a vehicle according to an implementation of the present disclosure.
Figure 4:
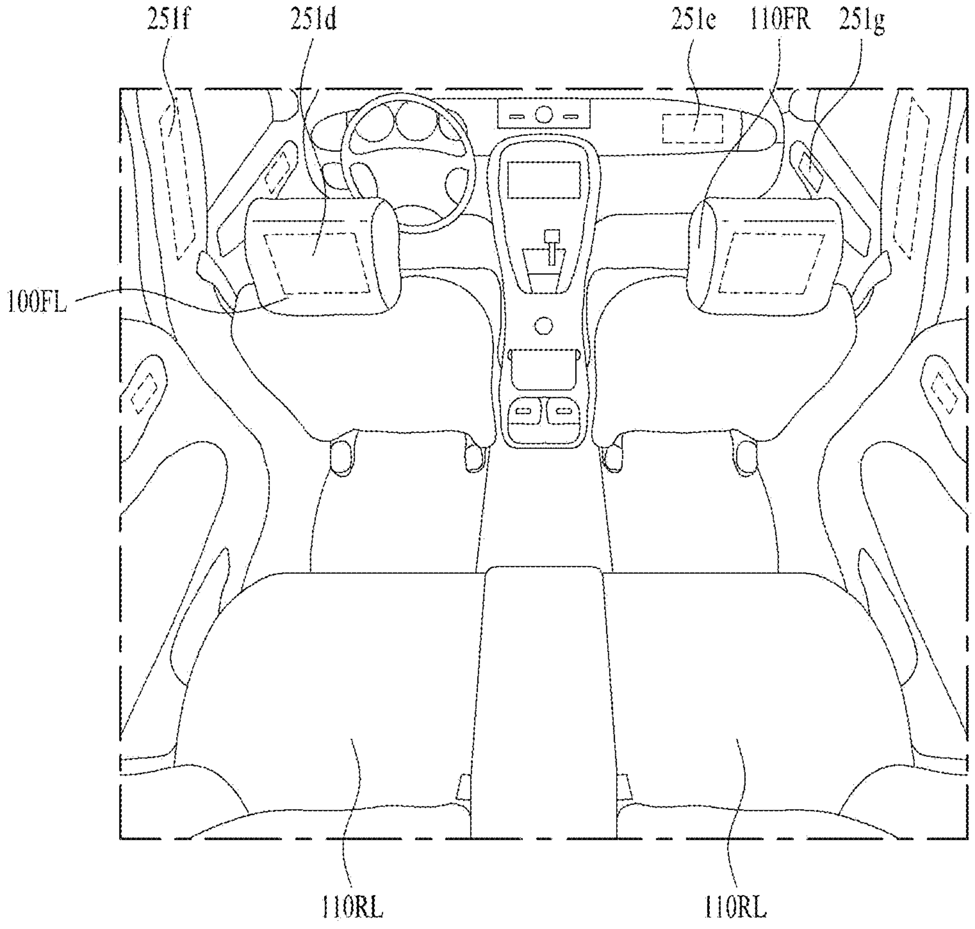

FIGS. 3 and 4 are views of the internal configuration of a vehicle according to an implementation of the present disclosure.

Figure 5:
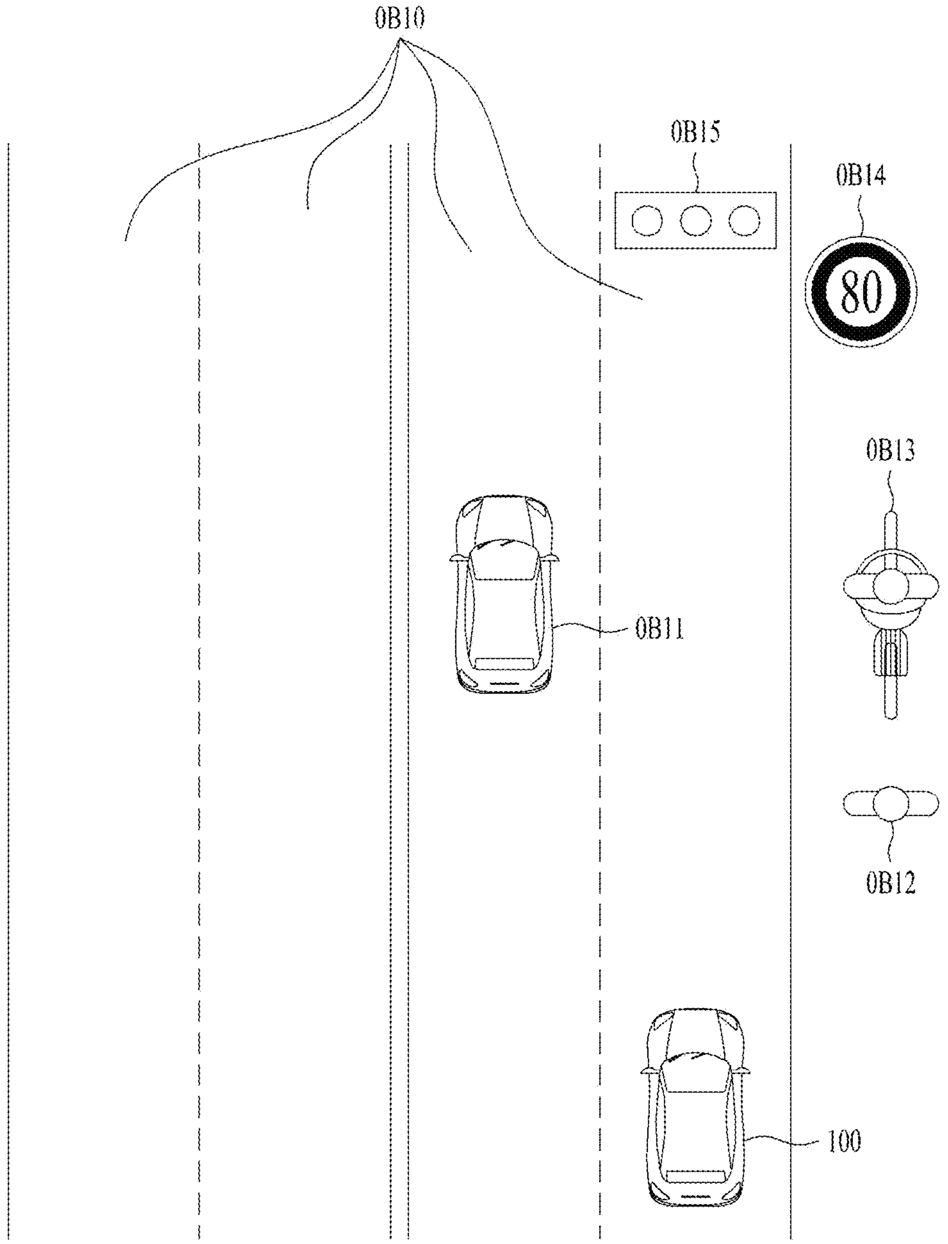
FIGS. 5 and 6 are diagrams illustrating various examples of object detection according to an implementation of the present disclosure.
Figure 6:
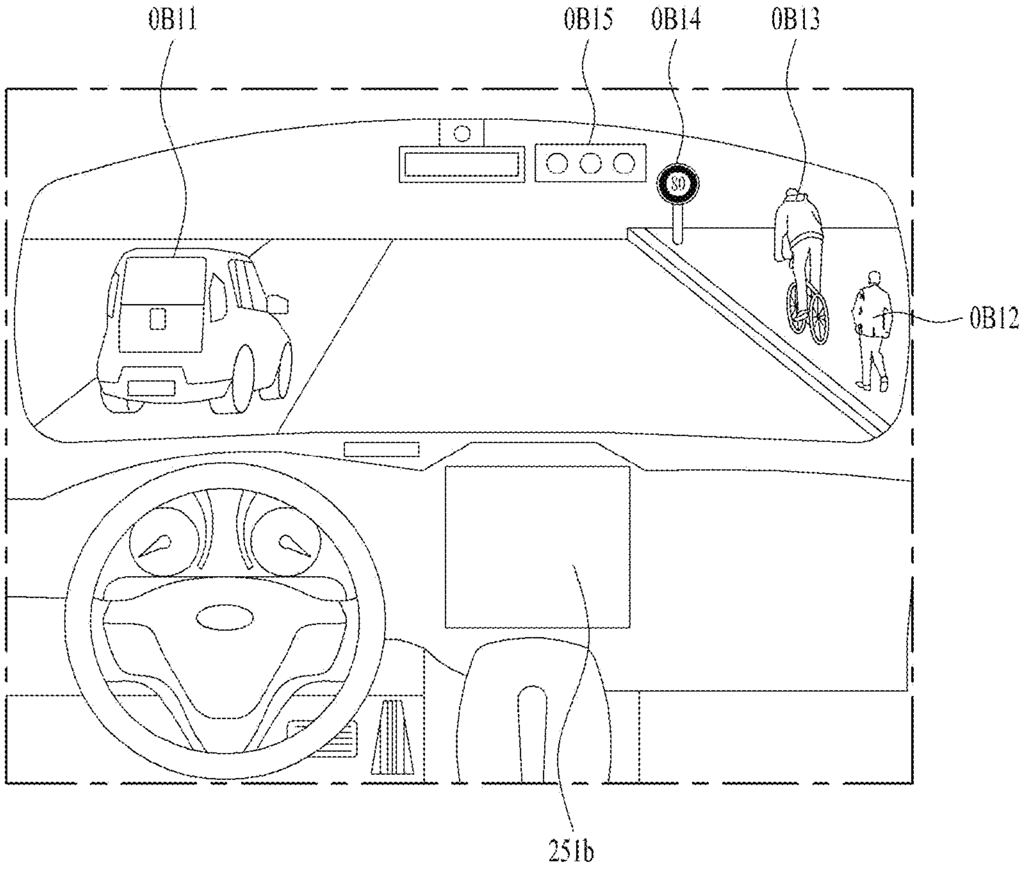

FIGS. 5 and 6 are views for explanation of objects according to an implementation of the present disclosure.

Figure 7:
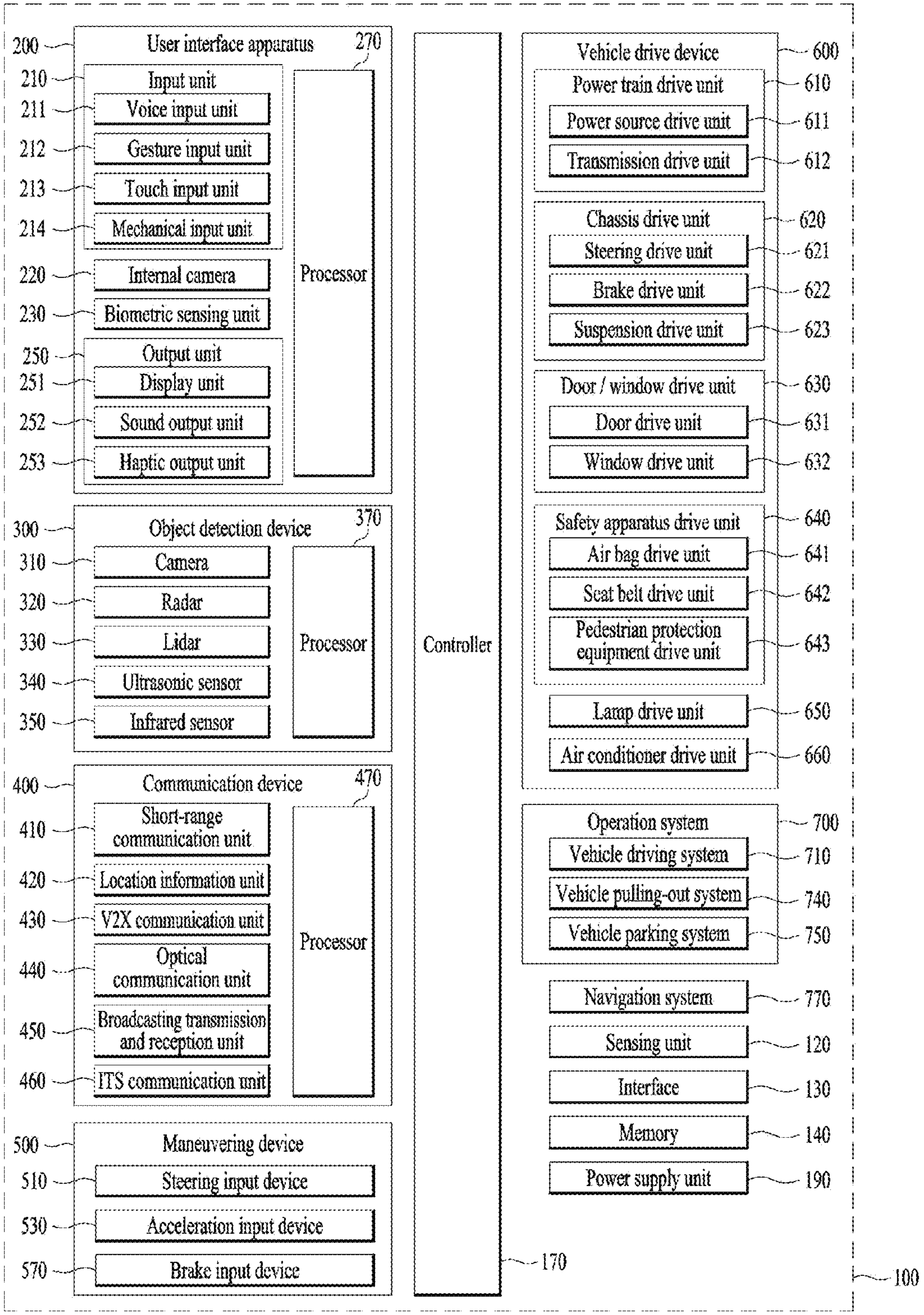
FIG. 7 is a block diagram illustrating an example of a vehicle according to an implementation of the present disclosure.

FIG. 7 is a block diagram illustrating a vehicle according to an implementation of the present disclosure.

Referring to FIGS. 1 to 7, a vehicle 100 may include a plurality of wheels, which are rotated by a power source, and a steering input device 510 for controlling a driving direction of the vehicle 100.

The vehicle 100 may be an autonomous vehicle.

The vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on driving environment information.

The driving environment information may include at least one of the following: information on an object outside a vehicle, navigation information, and vehicle state information.

For example, the vehicle 100 may be switched from the manual mode to the autonomous mode, or vice versa, based on driving environment information generated by the object detection device 300.

In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

Meanwhile, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively.

In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some embodiments, the gesture input unit 212 may sense a three-dimensional (3D) gesture input of a user. To this end, the gesture input unit 212 may include a plurality of light emitting units for outputting infrared light, or a plurality of image sensors.

The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a head up display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Meanwhile, the user interface device 200 may include a plurality of display units 251*a* to 251*g*.

The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251*c* of a windshield, or a region 251*h* of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some embodiments, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

Meanwhile, the user interface device 200 may be referred to as a display device for a vehicle.

The user interface device 200 may operate under control of the controller 170.

The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

Meanwhile, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an around view monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310*a*.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140.

Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

In a case where the object detection device 300 does not include the processor 370, the object detection device 300 may operate under control of the controller 170 or a processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400.

In some embodiments, the communication device 400 may include a plurality of processors 470, or may not include the processor 470.

In a case where the communication device 400 does not include the processor 470, the communication device 400 may operate under control of the controller 170 or a processor of a device inside of the vehicle 100.

Meanwhile, the communication device 400 may implement a vehicle display device, together with the user interface device 200. In this case, the vehicle display device may be referred to as a telematics device or an audio video navigation (AVN) device.

The communication device 400 may operate under control of the controller 170.

The maneuvering device 500 is configured to receive a user input for driving the vehicle 100.

In the manual mode, the vehicle 100 may operate based on a signal provided by the maneuvering device 500.

The maneuvering device 500 may include a steering input device 510, an acceleration input device 530, and a brake input device 570.

The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components.

Meanwhile, the vehicle drive device 600 may include a processor. Each unit of the vehicle drive device 600 may include its own processor.

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

Meanwhile, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

Meanwhile, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

Meanwhile, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor.

The vehicle drive device 600 may operate under control of the controller 170.

The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750.

In some embodiments, the operation system 700 may further include other components in addition to the aforementioned components, or may not include some of the aforementioned component.

Meanwhile, the operation system 700 may include a processor. Each unit of the operation system 700 may include its own processor.

Meanwhile, the operation system 700 may control driving in the autonomous mode based on learning. In this case, the learning mode and an operating mode based on the premise of completion of learning may be performed. A description will be given below of a method of executing the learning mode and the operating mode by the processor of the operation system 700.

The learning mode may be performed in the aforedescribed manual mode. In the learning mode, the processor of the operation system 700 may learn a driving route and ambient environment of the vehicle 100.

The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the aforedescribed autonomous mode. The operating mode will be described based on the premise that the driving route or the ambient environment has been learned in the learning mode.

The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500.

According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode.

According to an embodiment, the processor of the operation system 700 may park the vehicle 100 in the learned parking space by controlling the vehicle parking system 750 in the operating mode. Meanwhile, in some embodiments, in a case where the operation system 700 is implemented as software, the operation system 700 may be a subordinate concept of the controller 170.

Meanwhile, in some embodiments, the operation system 700 may be a concept including at least one selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device via the communication device 400.

Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170.

The driving system 710 may be referred to as a vehicle driving control device.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770.

In some embodiments, the navigation system 770 may update pre-stored information by receiving information from an external device via the communication device 400.

In some embodiments, the navigation system 770 may be classified as an element of the user interface device 200.

Hereinafter, an example in which an antenna according to embodiments is disposed in the vehicle above will be described.

Figure 8A:
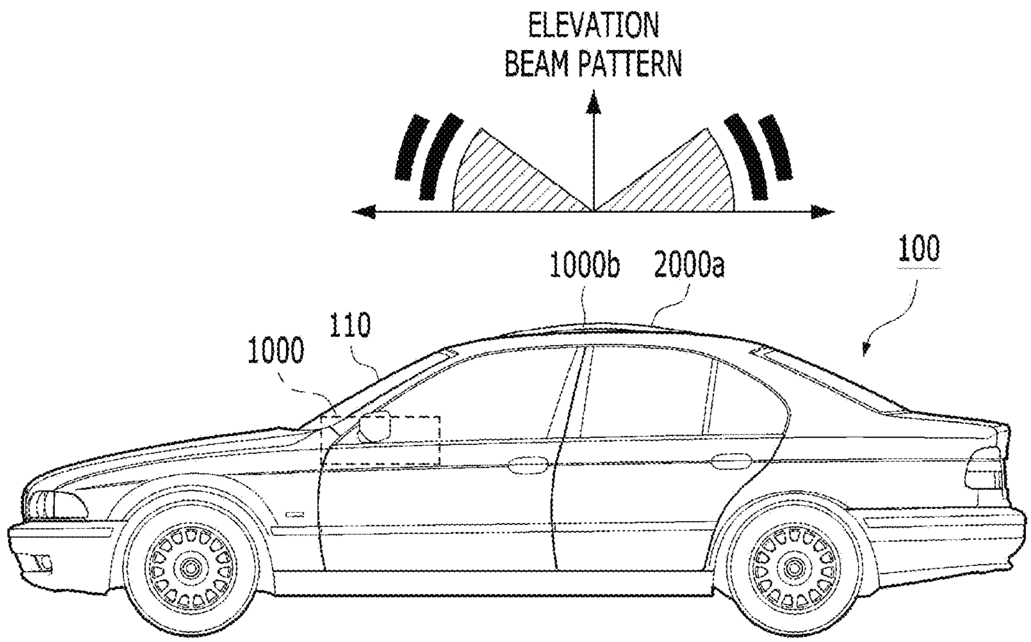
FIGS. 8A to 8C illustrate structures capable of mounting an antenna in a vehicle including the antenna according to embodiments.
Figure 8B:
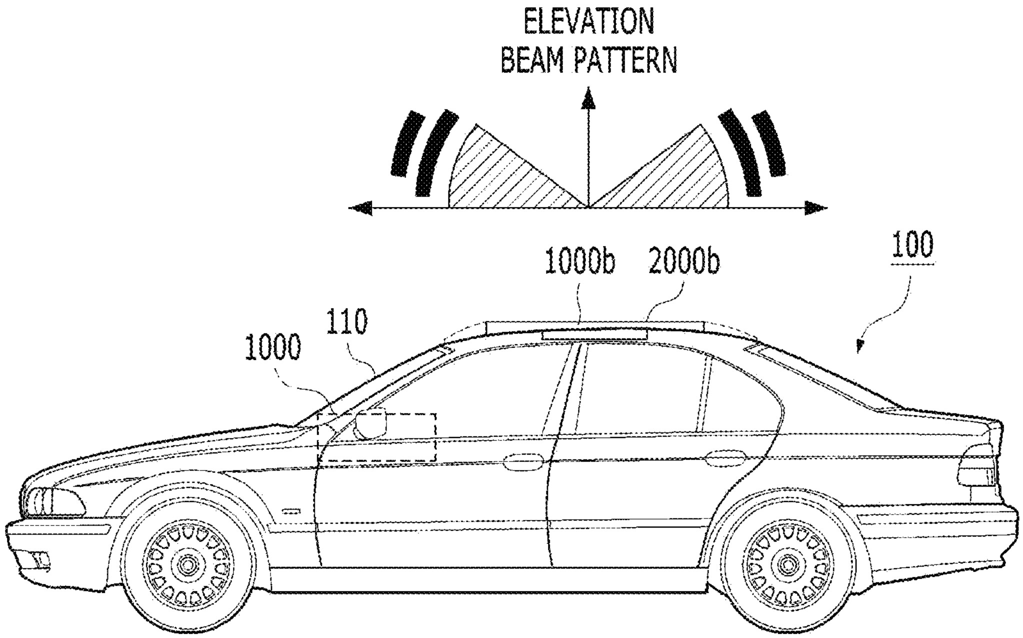
Figure 8C:
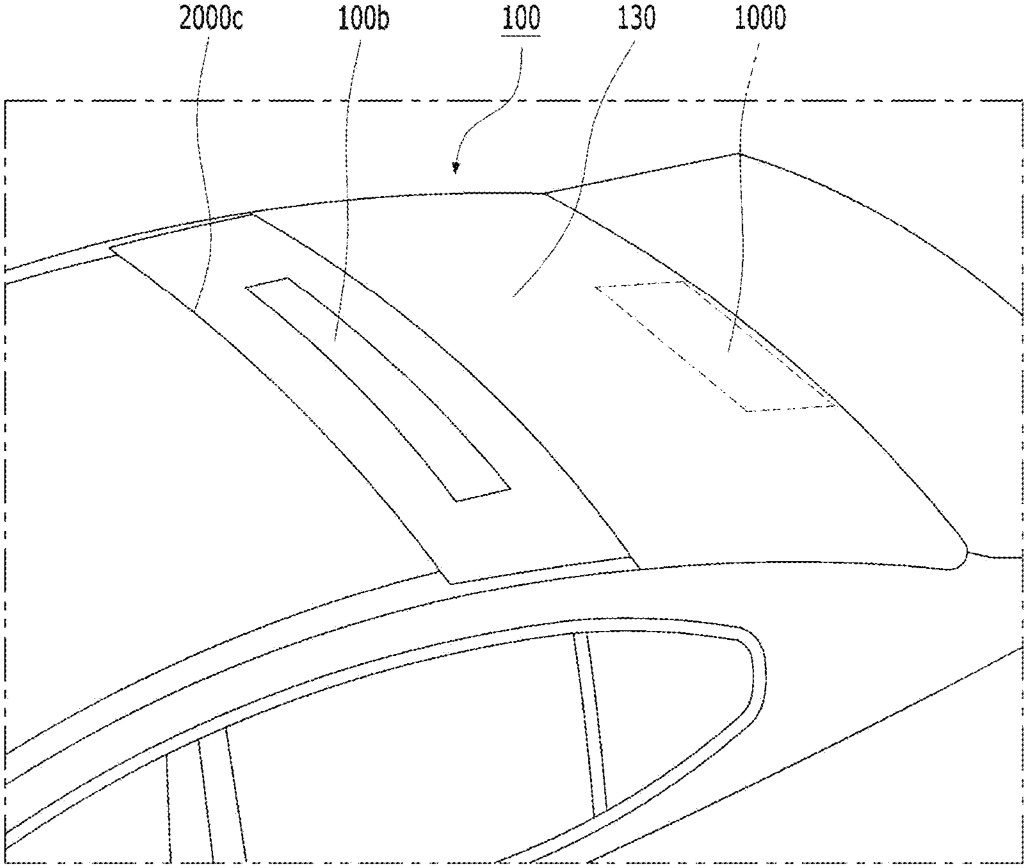

Regarding a vehicle including an antenna according to embodiments, FIGS. 8A to 8C illustrate structures of mounting the antenna in the vehicle.

FIGS. 8A to 8C are diagrams illustrating configurations capable of performing wireless communication through an antenna 1000 formed in a vehicle front glass 110. Wireless communication may be performed through an antenna formed in a vehicle side glass in addition to the vehicle front glass 110.

The antenna 1000 according to embodiments may be coupled with other antennas. For example, as shown in FIGS. 8A to 8C, the antenna 1000 may further include a second antenna 1000*b*. For example, as shown in FIG. 8A and FIG. 8B, the second antenna 1000*b* is mounted on or within a roof of the vehicle. Alternatively, for example, as shown in FIG. 8C, the second antenna 1000*b* is mounted in a roof frame of a roof and a rear mirror of the vehicle.

In order to improve the appearance of the vehicle 100 and preserve telematics performance upon collision, the antenna 1000 according to embodiments may replace an existing shark fin antenna with a flat antenna having a non-protruding shape. In addition, the antenna 1000 according to embodiments proposes an antenna in which an LTE antenna and a 5G antenna are integrated in consideration of 5G communication while providing the existing mobile communication service (LTE).

As shown in FIG. 8A, the antenna 1000 may be implemented in the front glass 110 of the vehicle and the interior of the vehicle. Also, for example, the second antenna 1000*b* is disposed on a roof of the vehicle. As illustrated in FIG. 8A, the antenna 1000 according to the embodiments may further include a radome 2000*a* for protecting the second antenna 1000*b* from an external environment and an external impact on vehicle driving. The radome dome 2000*a* is formed to surround the second antenna 1000*b*. The radome 2000*a* may be made of a dielectric material through which a radio wave signal transmitted/received between the second antenna 1000*b* and a base station may be transmitted.

As shown in FIG. 8*b*, the antenna 1000 may be implemented in the front glass 110 of the vehicle and/or the interior of the vehicle. The second antenna 1000*b* is disposed in a roof structure 2000*b* of the vehicle, for example. In this case, at least a part of the roof structure 2000*b* of the vehicle may be non-metal. The roof structure 2000*b* of the vehicle may be made of a dielectric material so that radio wave signals transceived between the second antenna 1000*b* and the base station may be transmitted therethrough.

As shown in FIG. 8*c*, for example, the antenna 1000 is implemented in a rear glass 130 of the vehicle and inside the vehicle. Also, for example, the second antenna 1000*b* is disposed inside a roof frame 2000*c* of the vehicle. In this case, at least a part of the roof frame 2000*c* of the vehicle may be non-metal. The roof frame 2000*c* of the vehicle may be made of a dielectric material so that radio wave signals transceived between the second antenna 1000*b* and the base station may be transmitted therethrough.

As shown in FIGS. 8A to 8C, a beam pattern by the antenna 1000 may be formed in a direction vertical to the front glass 110 or the rear glass 130. A beam coverage may be further formed by the second antenna 1000*b* by a prescribed angle in a horizontal region with respect to a vehicle body.

On the other hand, the vehicle 100 may not have an external antenna (e.g., the second antenna 1000*b*), but only an antenna unit (i.e., an internal antenna) 1000 corresponding to an internal antenna.

Hereinafter, an example in which the antenna 1000 is applied as the internal antenna to the vehicle 100 will be described.

Figure 9A:
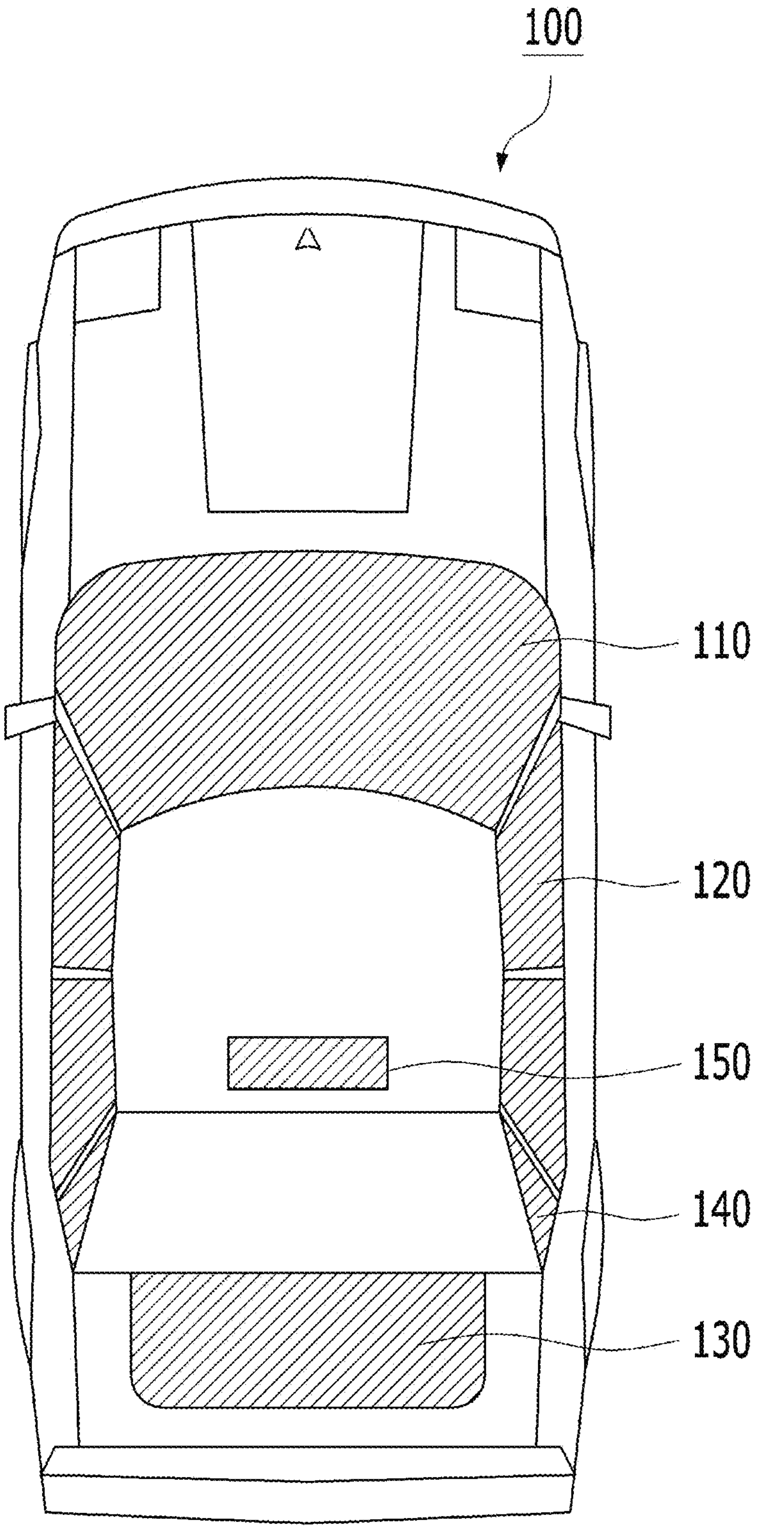
FIG. 9A is a diagram schematically illustrating glasses of a vehicle in which an antenna according to embodiments is disposed.
Figure 9B:
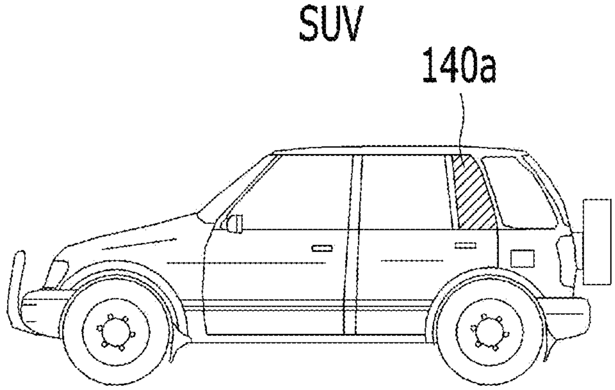
FIG. 9B is a diagram schematically illustrating the position and shape of a quarter glass corresponding to a partial area of a door area in different vehicles to which an antenna according to embodiments is applied.
Figure 9B:
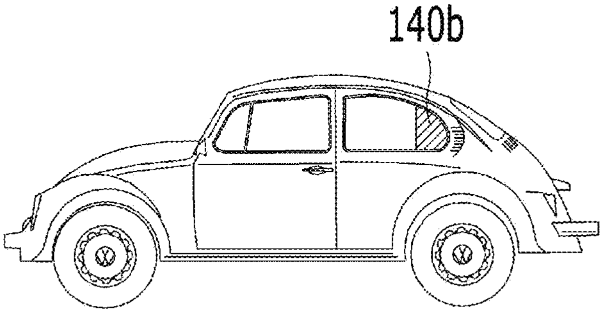
Figure 9B:
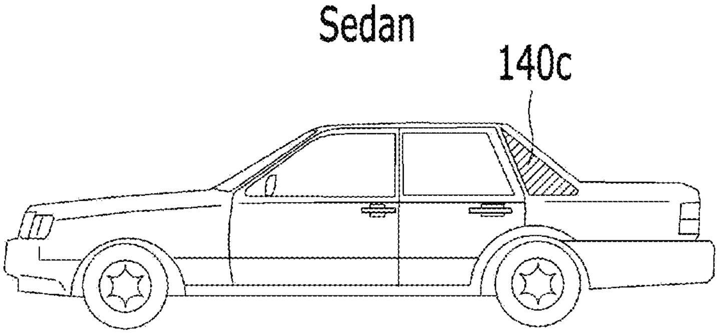

FIG. 9A is a diagram schematically illustrating a glass of a vehicle in which an antenna according to embodiments is disposed, and FIG. 9B is a diagram schematically illustrating positions and shapes of a quarter glass corresponding to a partial area of a door area in different vehicles to which an antenna according to embodiments is applied.

As shown in FIG. 9A, a vehicle 100 includes a front glass 110, a door glass 120, a rear glass 130, and a quarter glass 140. Meanwhile, the vehicle 100 may further include a top glass 150, which is a window formed in the roof frame 2000*c* shown in FIG. 8C.

The glass constituting the window of the vehicle 100 includes, for example, the front glass 110 disposed in a front area of the vehicle 100, the door glass 120 disposed in a door area of the vehicle 100, and a rear glass 130 disposed in a rear area of the vehicle. In addition, the glass may further include the quarter glass 140 disposed in a partial area of the door area of the vehicle. In addition, the glass may further include the top glass 150 spaced apart from the rear glass 130 and disposed in the upper area of the vehicle 100.

The front glass 110 prevents wind in a front direction from entering the vehicle 100 and is referred to as, for example, a front windshield. The front glass 110 is formed in a two-layer bonding structure having a thickness of, for example, about 5.0 to 5.5 mm. The front glass 110 is formed in, for example, a bonding structure of glass/shatter-proof film/glass. The door glass 120 is formed of, for example, a two-layer bonding structure or a one-layer compressed glass.

The rear glass 130 may be formed of a two-layer bonding structure or a one-layer compressed glass having a thickness of about 3.5 to 5.5 mm. A spaced distance between a heating wire and an AM/FM antenna and a transparent antenna is required in the rear glass 130.

The quarter glass 140 is formed of, for example, a one-layer compressed glass having a thickness of about 3.5 to 4.0 mm, but is not limited thereto.

Referring to FIG. 9B (a), a quarter glass 140*a* of a vehicle such as an SUV may be formed in a first shape having a first size.

Referring to FIG. 9B (b), a quarter glass 140*b* of a compact car having a shape similar to that of an SUV and a small vehicle size may be formed in the first shape of a second size. The second size of the quarter glass 140*b* of the compact car may be formed to be smaller than the first size of the quarter glass 140*a* of the vehicle such as the SUV.

Referring to FIG. 9B (c), a quarter glass 140*c* of a vehicle such as a sedan may be formed in a second shape having a third size, which is different from the first shape. Meanwhile, the third size of the quarter glass 140*c* of the vehicle such as the sedan may be formed to be smaller than the first size of the quarter glass 140*a* of the vehicle such as the SUV.

The size of the quarter glass 140 may vary depending on a type of vehicle, and may be configured to be significantly smaller than that of the front glass 110 or the rear glass 130. In order to dispose an antenna in the quarter glass 140, a small antenna pattern that may fit inside the quarter glass 140 should be designed. However, when an antenna size is reduced, radiation efficiency in a Low Band (LB) may decrease and a bandwidth may also be narrowed.

Therefore, there is a need for an antenna design that maintains radiation efficiency in an antenna of a small size and a wide band. In this regard, the disposition of a transparent antenna may be determined according to the vehicle glass specification and the TCU position, and there is a difference in the overall antenna performance depending on the antenna disposition.

Meanwhile, a wideband transparent antenna structure that may be disposed on a glass of a vehicle according to the present specification may be implemented as a single dielectric substrate on the same plane as a CPW feeding part. In addition, the wideband transparent antenna structure that may be disposed on the glass of the vehicle according to the present specification may be implemented in a structure in which ground is formed on both sides of a radiator to form a wideband structure.

Hereinafter, as an antenna disposed in a window of such a vehicle, an antenna that solves the above problems will be described in more detail.

Figure 10:
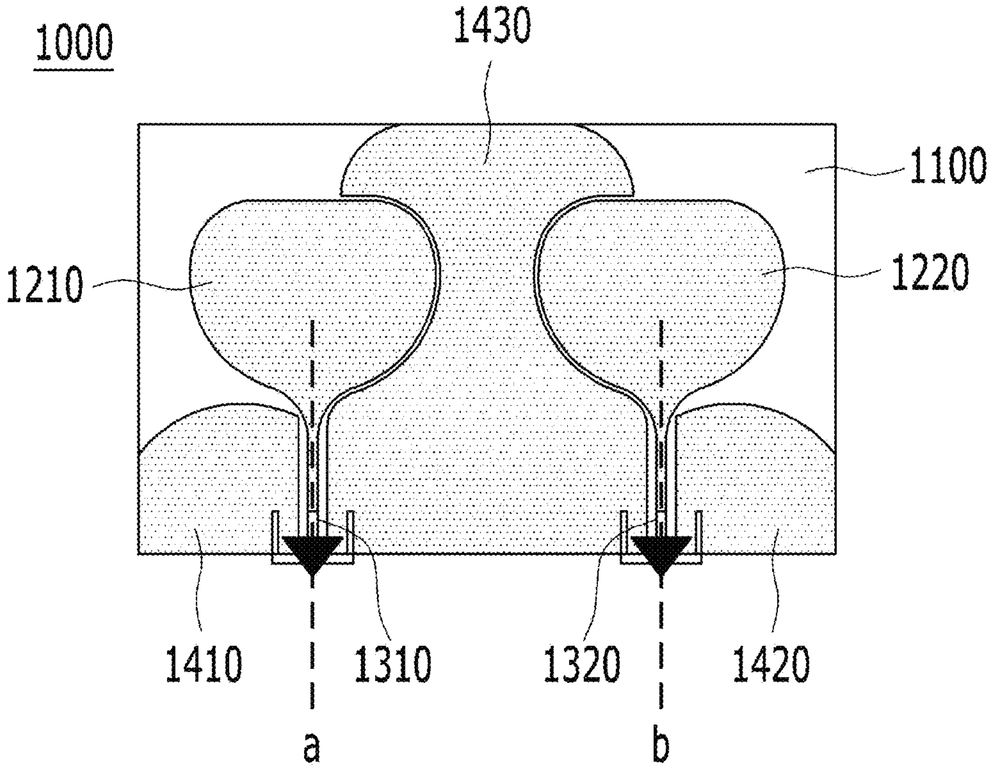
FIG. 10 is a diagram schematically illustrating a structure of an antenna according to embodiments.

FIG. 10 schematically illustrates a structure of an antenna according to embodiments.

An antenna 1000 according to embodiments transmits/receives data to/from the outside, as described in FIGS. 1 to 9. For example, the antenna 1000 provides a solution efficient for radiation or reception in order to radiate or receive radio waves for data transmission and reception. For example, the antenna 1000 provides a solution efficient method for radiation or reception of a full frequency bandwidth including a low frequency band, an intermediate frequency band, and/or a high frequency band. The full frequency bandwidth includes, for example, a wide bandwidth frequency of 0.5 GHz to 6.5 GHZ.

The antenna 1000 is provided on or inside the quarter glass 140 described with reference to FIG. 9, for example. Therefore, hereinafter, an antenna 1000 that is applicable to a relatively narrow space such as the quarter glass 140 will be described. However, an object to which the antenna 1000 is applied is not limited to the quarter glass 140, and the antenna 1000 is applied to all objects requiring an antenna for data transmission and reception.

The antenna 1000 is provided in a place where implementation of a transparent antenna is required, such as the quarter glass 140. For example, the antenna 1000 is provided in a window (e.g., a glass window) provided to the vehicle 100.

To this end, the antenna 1000 according to embodiments includes a substrate 1100, a radiating part (e.g., 1210 and 1220), a feeding line (e.g., 1310 and 1320), and a ground part (e.g., 1410, 1420, and 1430).

The substrate 1100 is, for example, a dielectric substrate. The substrate 1100 provides a space in which, for example, conductive, non-conductive, and/or semiconductive patterns are printed. In this case, the conductive, non-conductive, and/or semiconductive patterns are, for example, radiating parts (e.g., 1210 and 1220), feeding lines (e.g., 1310 and 1320) and/or ground parts (e.g., 1410, 1420, and 1430). The conductive, non-conductive, and/or semiconductive patterns printed on the substrate 1100 are provided on a single plane of the substrate 1100.

The radiating part (e.g., 1210 and 1220) is disposed on the substrate 1100 to emit a radio signal. Accordingly, the radiating part may be referred to as, for example, a radiator part.

The radiating part (e.g., 1210 and 1220) is electrically connected to the feeding line (e.g., 1310 and 1320). The radiating part includes, for example, a first radiating part 1210 and a second radiating part 1220. For convenience of description, a case in which the antenna 1000 includes two radiating parts will be described as an example. However, the antenna 1000 may include one or more radiating parts and may include, for example, four radiating parts.

The first radiating part 1210 is electrically connected to a first feeding line 1310 described below. The first radiating part 1210 receives a wireless signal from the first feeding line 1310. The second radiating part 1220 is electrically connected to a second feeding line 1320 described below. The second radiating part 1220 receives a wireless signal from the second feeding line 1320.

The feeding line (e.g., 1310 and 1320) is disposed on the substrate 1100. The feeding line (e.g., 1310 and 1320) supplies current to the radiating part (e.g., 1310 and 1320).

The feeding line (e.g., 1310 and 1320) include, for example, a first feeding line 1310 and a second feeding line 1320. Like the radiating part, for convenience of description, the present specification describes, as an example, a case in which the antenna 1000 includes two feeding lines. However, the antenna 1000 may include as many feeding lines as the number of the radiating parts.

Meanwhile, in FIG. 10, 'a' represents an extension line of the first feeding line 1310. Also, in FIG. 10, 'b' represents an extension line of the second feeding line 1320. As shown in FIG. 10, the extension line a of the first feeding line 1310 and the extension line b of the second feeding line 1320 are parallel to each other. Accordingly, in the antenna 1000 according to embodiments, the first radiating part 1210 and the second radiating part 1220 facilitate the ground sharing.

The ground part (e.g., 1410, 1420, and 1430) is disposed on the substrate 1100. The ground part (e.g., 1410, 1420, and 1430) is disposed to be spaced apart from the radiating part (e.g., 1210 and 1220).

The ground part includes a shared ground part 1430. The shared ground part 1430 is located between the first and second radiating parts 1210 and 1220. The shared ground part 1430 performs impedance matching between the first and second radiating parts 1210 and 1220. As described above, the antenna 1000 according to embodiments includes a structure in which the first and second radiating parts 1210 and 1220 share at least a portion of the ground part, and thus space may be efficiently utilized.

The ground part may further include a first ground part 1410 and a second ground part 1420. The first ground part 1410 is located adjacent to the first radiating part 1210. The first ground part 1410 performs impedance matching on the first radiating part 1210. Yet, the first ground part 1410 may partially perform impedance matching on the second radiating part 1220. The second ground part 1420 is located adjacent to the second radiating part 1220. The second ground part 1420 performs impedance matching on the second radiating part 1220. Yet, the second ground part 1420 may partially perform impedance matching on the first radiating part 1210.

Through the above structure, the antenna 1000 according to embodiments may provide an antenna operating in a wideband manner, for example, an antenna made of a transparent material. Also, the antenna 1000 according to embodiments may relatively use a space efficiently.

However, when the extension line a of the first feeding line 1310 and the extension line b of the second feeding line 1320 are arranged in parallel as described above, there is a problem that it is difficult to apply to a narrower space, for example, such as a quarter glass. Also, there is a problem that the radiation of a high frequency band by the first feeding line 1310 occupies a vehicle side. Also, as the feeding line (e.g., 1310 and 1320) is lengthened, feeding loss occurs due to an increase in a length of a lossy feeder. In this case, the radiation efficiency decreases, and for example, there is a problem that the radiation efficiency is low in the low frequency band.

Therefore, hereinafter, proposed us an antenna structure capable of more efficiently arranging a space. In addition, an antenna structure in which an efficiency bandwidth is increased and an impedance bandwidth is increased will be described in detail.

Figure 11:
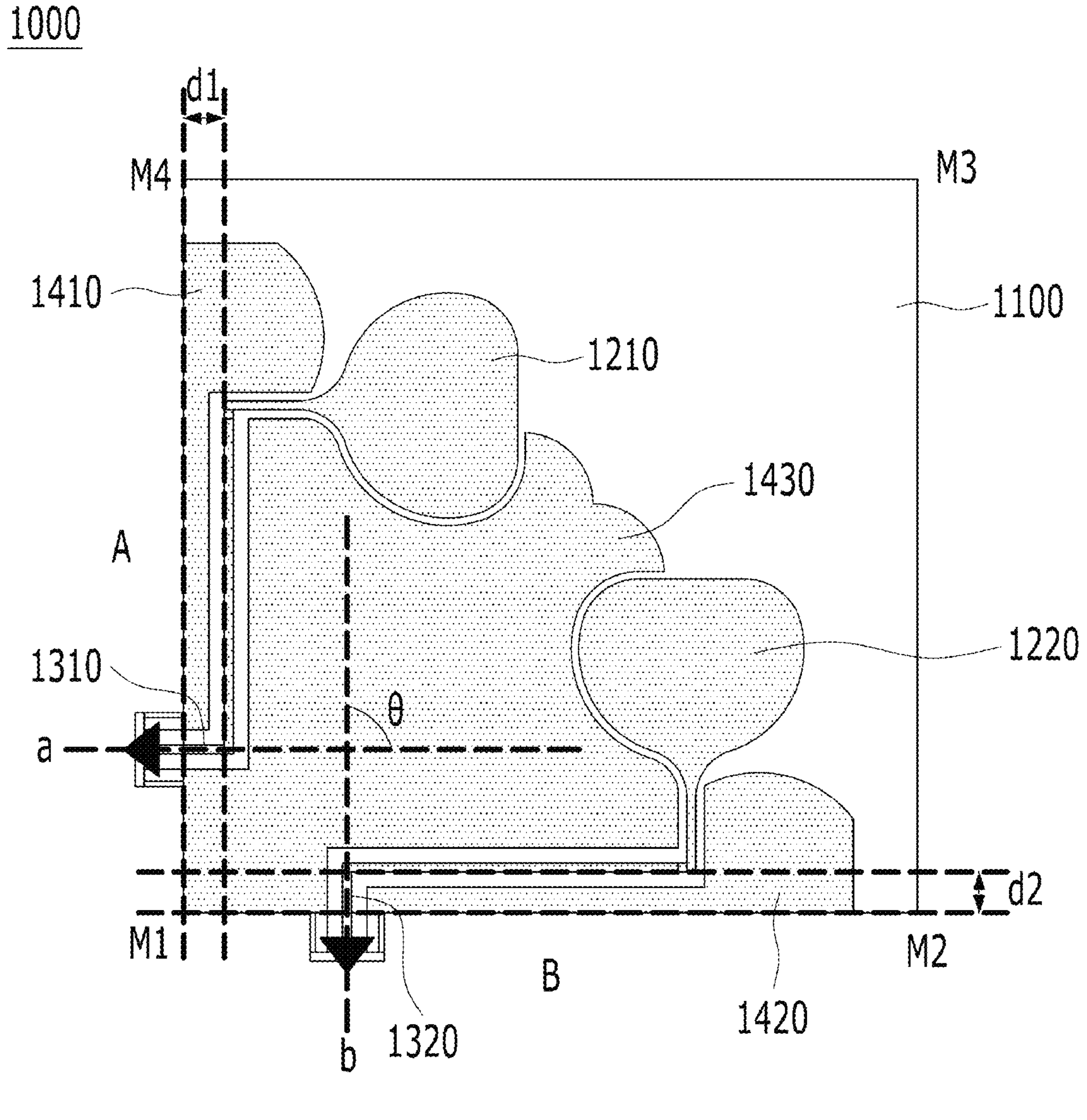
FIG. 11 is a diagram schematically illustrating a structure of an antenna according to embodiments.

FIG. 11 schematically illustrates a structure of an antenna according to embodiments.

An antenna 1000 according to embodiments transmits/receives data to/from the outside, as described in FIGS. 1 to 10. For example, the antenna 1000 provides an efficient method for radiation or reception in order to radiate or receive radio waves for data transmission and reception. Hereinafter, descriptions of the same or similar configurations and/or descriptions as described above will be omitted.

The antenna 1000 includes a substrate 1100, a radiating part (e.g., 1210 and 1220), a feeding line (e.g., 1310 and 1320), and a ground part (e.g., 1410, 1420, and 1430). In this case, the radiating part includes, for example, a first radiating part 1210 and a second radiating part 1220. Also, the feeding line includes, for example, a first feeding line 1310 and a second feeding line 1320. The ground part includes, for example, a first ground part 1410, a second ground part 1420, and a shared ground part 1430.

The substrate 1100 may have a polygonal shape, for example, as illustrated in FIG. 11, and may have a rectangular shape. For example, the substrate 1100 has a square shape. The substrate 1100 has, for example, a size of 90 mm×90 mm. In this case, the substrate 1100 includes two surfaces adjacent to each other. Two surfaces adjacent to each other include, for example, a first surface A and a second surface B. When the substrate 1100 has a square shape, the first surface A and the second surface B are vertically adjacent to each other. In addition, for example, when the substrate 1100 has a polygonal shape, the substrate 1100 includes two or more corners. For example, when the substrate 1100 has a rectangular shape, the substrate 1100 includes four corners M1, M2, M3, and M4. In this case, the first corner M1, the second corner M2, the third corner M3, and the fourth corner M4 are disposed clockwise.

The first feeding line 1310 and the second feeding line 1320 are disposed adjacent to each other.

For example, the first feeding line 1310 and the second feeding line 1320 are disposed on two surfaces adjacent to each other. For example, as illustrated in FIG. 11, the first feeding line 1310 and the second feeding line 1320 are disposed in directions toward the first surface A and the second surface B. Alternatively, for example, unlike the illustration in FIG. 11, the first feeding line 1310 and the second feeding line 1320 are disposed on two surfaces having an adjacent surface in common.

Also, for example, as illustrated in FIG. 11, the first feeding line 1310 is disposed closer to the first corner M1 of the first corner M1 and the fourth corner M4 on the first surface A. Also, the second feeding line 1320 is disposed closer to the first corner M2 of the first corner M1 and the second corner M2 on the second surface B. That is, the first feeding line 1310 and the second feeding line 1320 are disposed closer to the first corner M1, and thus are disposed adjacent to each other.

Meanwhile, in FIG. 11, 'a' represents an extension line of the first feeding line 1310. Also, in FIG. 11, 'b' represents an extension line of the second feeding line 1320. As shown in FIG. 11, the extension line a of the first feeding line 1310 and the extension line b of the second feeding line 1320 intersect each other. Accordingly, for example, the extension line a of the first feeding line 1310 and the extension line b of the second feeding line 1320 intersect with each other at an arbitrary angle θ.

The arbitrary angle θ is greater than 0° and less than 180°. Preferably, the arbitrary angle θ is greater than 0° and equal to or less than 90°. The arbitrary angle θ is, for example, 90°. When the arbitrary angle θ is 90°, the first feeding line 1310 and the second feeding line 1320 are disposed perpendicular to each other. In this case, the first feeding line 1310 is disposed perpendicular to the first surface A on the first surface A. Also, the second feeding line 1320 is disposed perpendicular to the second surface B on the second surface B.

Meanwhile, when the substrate 1100 includes a curved surface, the first feeding line 1310 and the second feeding line 1320 may be disposed on the same curved surface. Even in this case, the extension line a of the first feeding line 1310 and the extension line b of the second feeding line 1320 intersect each other by a curvature of the curved surface to form an arbitrary angle θ.

One side of the first feeding line 1310 is connected to an external wire through the first surface A, and is connected to, for example, a cable (see FIG. 21) embedded in the vehicle. One side of the second feeding line 1320 is connected to an external wire through the second surface B, and is connected to, for example, a cable (see FIG. 21) embedded in the vehicle. When the substrate 1100 has a square shape, the first feeding line 1310 and the second feeding line 1310 are formed on two adjacent surfaces, respectively, and are connected to an external wire.

However, for example, unlike FIG. 11, the substrate 1100 may be formed in a circular shape, a polygonal shape, or a polygonal shape partially having a curved surface instead of a rectangular shape. In this case, the first surface on which the first feeding line 1310 is disposed and the second surface on which the second feeding line 1320 is disposed do not have to be adjacent to each other. That is, when the extension line a of the first feeding line 1310 and the extension line b of the second feeding line 1320 are formed to cross each other, the shape of the substrate 1100 or the disposition of the feeding line (e.g., 1310 and 1320) may be any shape or disposition.

By disposing the first feeding line 1310 and the second feeding line 1320 close together, as described above, the antenna 1000 according to the embodiments may efficiently perform space disposition.

One side of the first feeding line 1310 is connected to an external wire, and the other side is connected to the first radiating part 1210. The first feeding line 1310 is formed along the first surface A in at least a portion of a section connecting one side to the other side. For example, the first feeding line 1310 is connected to an external wire through the first surface A. When the first feeding line 1310 passes through the first surface A, it is formed parallel to the first surface A in a state of being spaced apart from the first surface A by a predetermined distance D1. That is, the first feeding line 1310 is spaced apart from the first surface A except for a section connected to the external wire or the first radiating part 1210, and is formed along the first surface A. In this case, the predetermined distance D1 does not necessarily have to be maintained, and the first feeding line 1310 may be formed along the first surface A in a state of partially being bent or protruding. The first feeding line 1310 is formed along the first surface A and then connected to the first radiating part 1210. In this case, the first feeding line 1310 may not be formed along the first surface A to connect the first feeding line 1310 and the first radiating part 1210. For example, a connection point between the first feeding line 1310 and the first radiating part 1210 may have an angle with respect to the first surface A.

Also, one side of the second feeding line 1320 is connected to an external wire, and the other side is connected to the second radiating part 1220. The second feeding line 1320 is formed along the second surface B in at least a portion of a section connecting one side to the other. For example, the second feeding line 1320 is formed parallel to the second surface A in a state of being spaced apart from the second surface B by a predetermined distance D2. That is, the second feeding line 1320 is spaced apart from the second surface A except for a section connected to the external wire or the second radiating part 1220, and is formed along the second surface B. In this case, the predetermined distance D2 does not necessarily have to be maintained, and the second feeding line 1320 may be formed along the second surface B in a state of partially being bent or protruding. The second feeding line 1320 is formed along the second surface B and then connected to the second radiating part 1220. In this case, in order to connect the second feeding line 1320 and the second radiating part 1220, the second feeding line 1320 may not be formed along the second surface B. For example, a connection point between the second feeding line 1310 and the second radiating part 1220 may have an angle with respect to the second surface B.

Through the above structure, the antenna 1000 according to the embodiments may allow the first radiating part 1210 and the second radiating part 1220 to be disposed at the greatest distance from each other. Accordingly, the antenna 1000 may minimize the interference generated between the first radiating part 1210 and the second radiating part 1220.

As described above, the antenna 1000 according to embodiments increases space utilization. Accordingly, the antenna 1000 may be applied to a narrow space. In addition, the antenna 1000 may adjust a high frequency band radiation direction. Accordingly, the antenna 1000 may adjust an antenna direction to a direction advantageous for communication owing to the adjustment of the high frequency band radiation direction.

Figure 12:
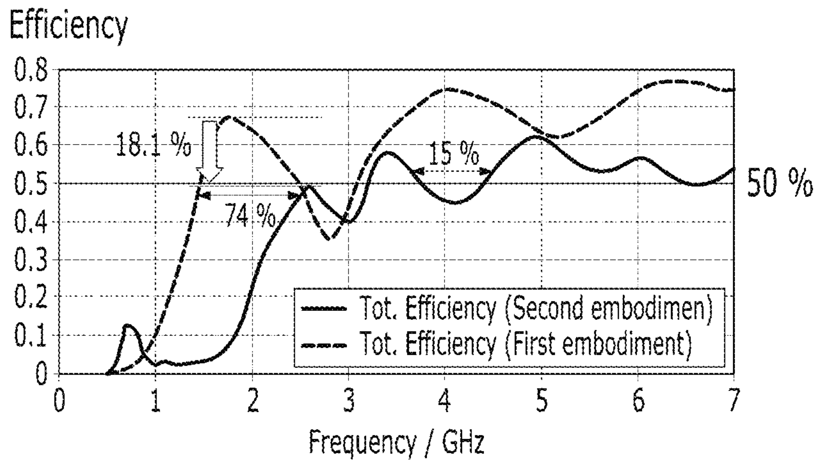
FIG. 12 is a graph of comparing technical effects of the embodiments described in FIG. 10 and FIG. 11.
Figure 12:
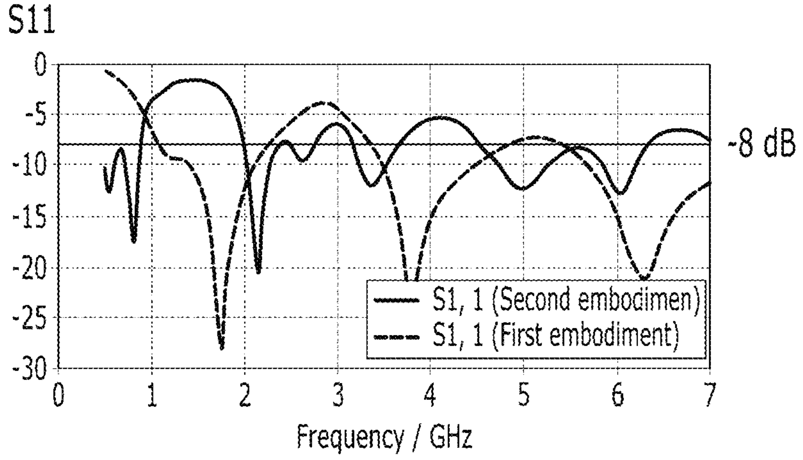

FIG. 12 is a graph of comparing technical effects of the embodiments described in FIG. 10 and FIG. 11.

For convenience of description, the structure of the antenna 1000 described in FIG. 10 is referred to as a first embodiment, and the structure of the antenna 1000 described in FIG. 11 is referred to as a second embodiment. In FIG. 12, a dotted line indicates the first embodiment. In FIG. 12, a solid line indicates the second embodiment.

FIG. 12(*a*) is a graph illustrating efficiency according to a frequency band. In FIG. 12(*a*), a horizontal axis represents a frequency band. For example, the horizontal axis represents a frequency band in the range of 0 to 7 GHZ. In FIG. 12(*a*), a vertical axis represents radiation efficiency of an antenna. The antenna radiation efficiency is an extent of using a power supplied for impedance matching with respect to a power supplied to the antenna. Also, when the efficiency according to the frequency band is 50% or more, it is assumed that the data transmission and reception described with reference to FIGS. 1 to 12 are smoothly performed.

Through FIG. 12(*a*), it may be seen that in a low frequency band, a maximum efficiency reference efficiency of the second embodiment is reduced by about 18% in comparison with the first embodiment. Also, it may be seen that a starting point of a bandwidth of the first embodiment is about 1.46 GHZ, but a starting point of a bandwidth of the second embodiment is about 2.60 GHz. Also, it may be seen that an intermediate frequency bandwidth of the second embodiment is reduced by 15% in comparison with the first embodiment.

FIG. 12(*b*) is a graph showing redundancy according to a frequency band. In FIG. 12(*b*), a horizontal axis indicates a frequency band. In FIG. 12(*b*), a vertical axis indicates redundancy. Redundancy indicates an extent of returning a power supplied to the antenna 1000 without being used for impedance matching despite being inputted for the impedance matching. Referring to FIG. 12(*b*), the second embodiment shows that antenna resonance is relatively formed even in a low bandwidth. However, at the same time, it may be seen that the impedance matching characteristics of the second embodiment are relatively poor.

As described in FIG. 11, the second embodiment provides a structure with increased space utilization, compared to the first embodiment. Also, the second embodiment may adjust a direction of high-frequency band radiation, compared to the first embodiment. Also, the second embodiment provides a structure more suitable for miniaturization, compared to the first embodiment. However, as described in FIG. 12, it may be seen that the second embodiment has the radiation efficiency lowered due to feeding loss, compared to the first embodiment.

Accordingly, an antenna structure for increasing space utilization, adjusting a high frequency band radiation direction, and increasing radiation efficiency is required. Hereinafter, an antenna structure providing such technical effects will be described in more detail.

Figure 13:
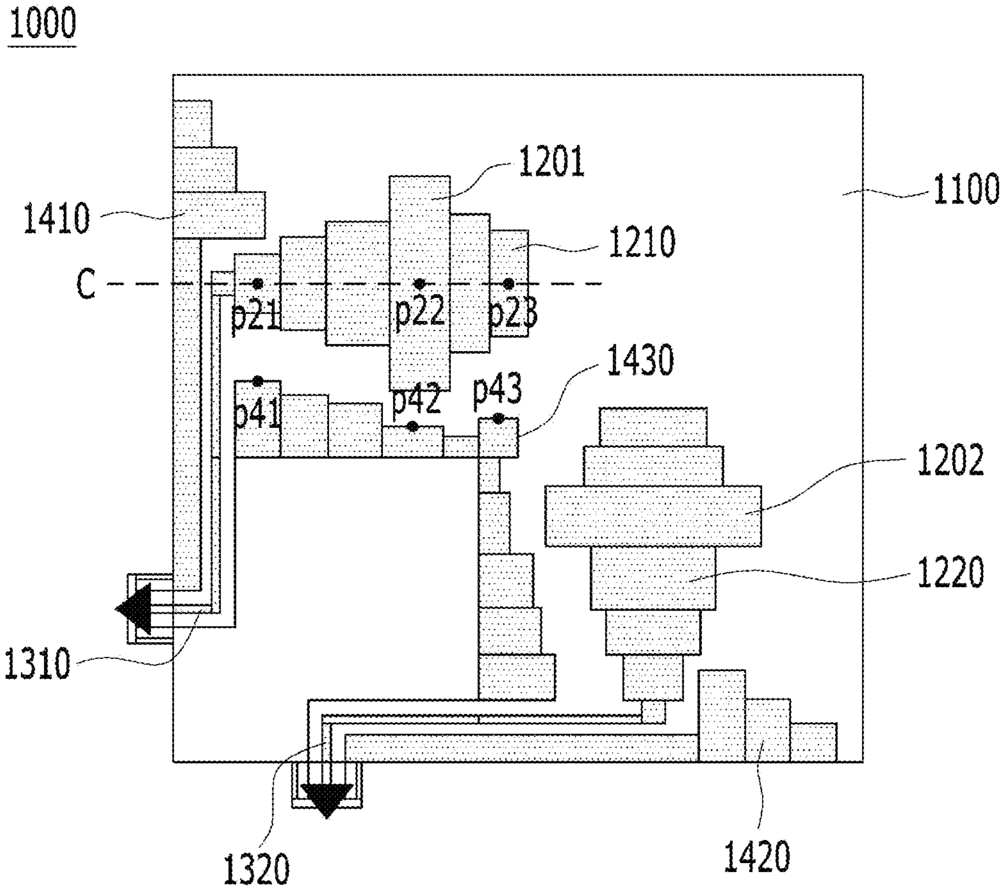
FIG. 13 is a diagram schematically illustrating a structure of an antenna according to embodiments.

FIG. 13 schematically illustrates a structure of an antenna according to embodiments.

An antenna 1000 according to embodiments transmits/receives data to/from the outside, as described in FIGS. 1 to 12. For example, the antenna 1000 provides an efficient method for radiation or reception in order to radiate or receive radio waves for data transmission and reception. Hereinafter, descriptions of the same or similar configurations and/or descriptions as described above will be omitted.

The antenna 1000 includes a substrate 1100, a radiating part (e.g., 1210 and 1220), a feeding line (e.g., 1310 and 1320), and a ground part (e.g., 1410, 1420, and 1430). In this case, the radiating part includes, for example, a first radiating part 1210 and a second radiating part 1220. Also, the feeding line includes, for example, a first feeding line 1310 and a second feeding line 1320. The ground part includes, for example, a first ground part 1410, a second ground part 1420, and a shared ground part 1430.

The antenna 1000 provides a structure in which at least a portion of a boundary area of the radiating part (e.g., 1210, 1220) and/or the ground part (e.g., 1410, 1420, 1430) is stepped or includes a protrusion or a concave portion to increase radiation efficiency.

Referring to FIG. 13, 'c' represents a center line of the first radiating part 1210. In this case, the center line is determined based on an extension line of a point at which the first feeding line 1310 and the first radiating part 1210 are connected.

Also, in FIG. 13, 'p21' represents a first point on the center line c of the first radiating part 1210. In this case, the first point p21 is a point on a side where the first radiating part 1210 and the first feeding line 1310 are connected. 'p23' represents a third point of the first radiating part 1210 farthest from the first point p21 on the center line c of the first radiating part 1210. 'p22' represents a second point as an arbitrary point on the center line c of the first radiating part 1210 located between the first point p21 and the third point p23.

Also, in FIG. 13, 'p41' represents a first point, which is a point of a boundary area of the shared ground part 1430. The first point p41 is a point corresponding to the shortest distance between the first point p21 and the shared ground part 1430 as a point corresponding to the first point p21. In FIG. 13, 'p42' represents a second point, which is a point of a boundary area of the shared ground part 1430. The second point p42 is a point corresponding to a shortest distance between the second point p22 and the boundary area of the shared ground part 1430 as a point corresponding to the second point p22. In FIG. 13, 'p43' represents a third point, which is a point of a boundary area of the shared ground part 1430. The third point p43 is a point corresponding to a shortest distance between the boundary area of the wp3 point p23 and the shared ground part 1430 as a point corresponding to the third point p23.

At least a portion of a boundary area of the radiating part (e.g., 1210 and 1220) is formed in a step shape, for example. Hereinafter, for convenience of description, the first radiating part 1210 will be described as an example, but the description of the second radiating part 1220 is also the same as or similar to the description of the first radiating part 1210.

For example, as illustrated in FIG. 13, the boundary area of the first radiating part 1210 may have the form of ascending stairs from the first point p21 to the second point p22. Alternatively, for example, the boundary area of the radiating part (e.g., 1210 and 1220) may have the form of descending stairs from the second point p22 to the third point p23. Alternatively, for example, unlike the illustration in FIG. 13, the boundary area of the radiating part (e.g., 1210 and 1220) may have the form of ascending or descending stairs from the first point p21 to the third point p23. In this case, the height of each step or the width of each step may be different for each floor, or may be the same. Also, a corner of each stair may have a round shape or an angled shape.

The radiating part (e.g., 1210 and 1220) includes one or more protrusions in the boundary area. For example, the first radiating part 1201 includes a first protrusion 1201 in the boundary area. In this case, for example, the first protrusion 1201 is formed at the second point p22. Likewise, for example, the second radiating part 1202 includes a second protrusion 1202 in the boundary area.

At least a portion of the boundary area of the ground part (e.g., 1410, 1420, and 1430) includes a stair shape. Hereinafter, for convenience of description, the shared ground part 1430 will be described as an example, but the description of the first and second ground parts 1410 and 1420 is also the same as or similar to the description of the shared ground part 1430.

For example, as shown in FIG. 13, a boundary area of the shared ground part 1430 may have a shape of descending stairs from the first point p41 to the second point p42. In this way, for example, the shared ground part 1430 may have a shape corresponding to the radiating part (e.g., 1210 and 1220) in at least a portion of the boundary area in a direction facing the radiating part (e.g., 1210 and 1220). For example, when one area of the first radiating part 1210 protrudes, the boundary area of the shared ground part 1430 corresponding to the first radiating part 1210 may be formed to be concave.

Alternatively, for example, the boundary area of the shared ground part 1430 may have a concave shape between the second point p42 and the third point p43. That is, the boundary area of the radiating part (e.g., 1210 and 1220) and the boundary area of the shared ground part 1430 do not have to correspond to each other.

As described above, the boundary area of the radiating part (e.g., 1210, 1220) and/or the shared ground part 1430 may be any shape in which multiple resonance points may be formed. Through such a structure, the antenna 1000 according to embodiments resonates by a length equal to half wavelength depending on a frequency so that a current is formed on a surface of the radiating part (e.g., 1210 and 1220). In this case, the length of the half wavelength is, for example, 0.4λ to 0.6λ. When the surface current formed in this way is in the out-of-phase state with the ground part (e.g., 1410, 1420, and 1430), the radiating part (e.g., 1210 and 1220) performs radiation.

In this case, as described above, the antenna 1000 according to embodiments is formed such that the radiating part (e.g., 1210 and 1220) and/or the ground part (e.g., 1410, 1420, 1430) has a staircase shape or one or more protrusions. The antenna 1000 allows multiple resonance points to be formed in the radiating part (e.g., 1210 and 1220) and/or the ground part (e.g., 1410, 1420, and 1430). The antenna 1000 increases a main surface current. In this case, the main surface current has, for example, a half wavelength length. The antenna 1000 increases a point at which the out-of-phase state occurs. Accordingly, the antenna 1000 may create a band in which radiation efficiency increases and provide wideband radiation efficiency.

Figure 14:
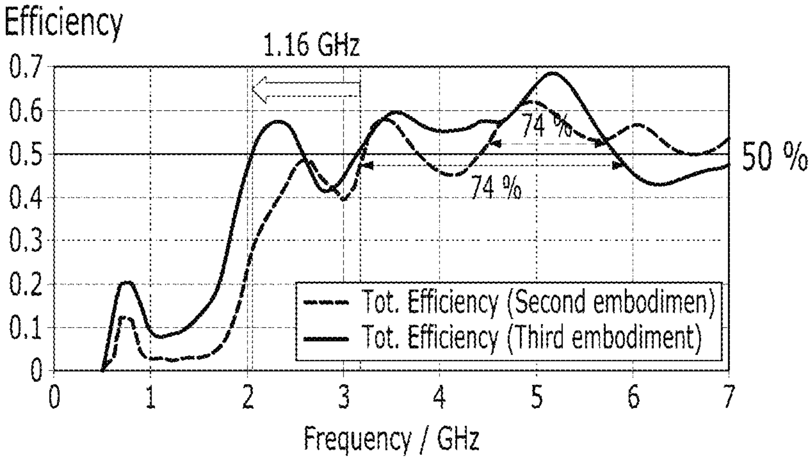
FIG. 14 is a graph of comparing technical effects of the embodiments described in FIG. 11 and FIG. 13.
Figure 14:
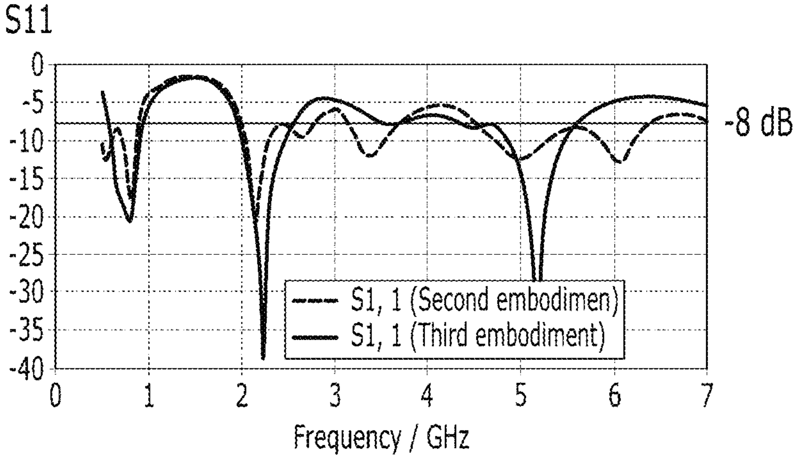

FIG. 14 is a graph of comparing technical effects of the embodiments described in FIG. 11 and FIG. 13.

For convenience of description, the structure of the antenna 1000 described in FIG. 11 is referred to as the second embodiment, and the structure of the antenna 1000 described in FIG. 13 is referred to as a third embodiment. In FIG. 14, a dotted line indicates the second embodiment. In FIG. 14, a solid line indicates the third embodiment. Hereinafter, descriptions of the same or similar configurations and/or descriptions as described above will be omitted.

FIG. 14(*a*) is a graph illustrating efficiency according to a frequency band. In FIG. 14(*a*), a horizontal axis represents a frequency band. In FIG. 14(*a*), a vertical axis represents radiation efficiency of an antenna.

As shown in FIG. 14(*a*), the second embodiment has a bandwidth of about 30% in a high frequency band. Also, the third embodiment has a bandwidth of about 59% in a high frequency band. Accordingly, it may be seen that the bandwidth of the third embodiment is increased by about 29% in the high frequency band, compared to the second embodiment.

Also, in the third embodiment, a starting point of the bandwidth is about 2.05 GHz. Also, in the second embodiment, a starting point of the bandwidth is about 3.21 GHZ. Accordingly, it may be seen that the bandwidth capable of resonance in the third embodiment is increased as compared to the second embodiment.

FIG. 14(*b*) is a graph showing redundancy according to a frequency band. In FIG. 14(*b*), a horizontal axis indicates a frequency band. In FIG. 14(*b*), a vertical axis indicates redundancy. It may be seen from FIG. 14(*b*) that the third embodiment has multiple resonance points, compared to the second embodiment. Accordingly, the third embodiment contributes to an increase in impedance matching characteristics of the antenna 1000.

As described in FIG. 13, the third embodiment provides a structure with increased impedance matching characteristics as compared to the second embodiment. Also, it may be seen that the frequency bandwidth of the third embodiment is increased as compared to the second embodiment.

As such, the antenna 1000 according to embodiments provides an antenna structure in which impedance matching characteristics and frequency bandwidth are increased. Hereinafter, a structure of the antenna 1000 capable of reducing the feeding loss and performing low frequency band radiation while having the above-described characteristics will be described.

Figure 15:
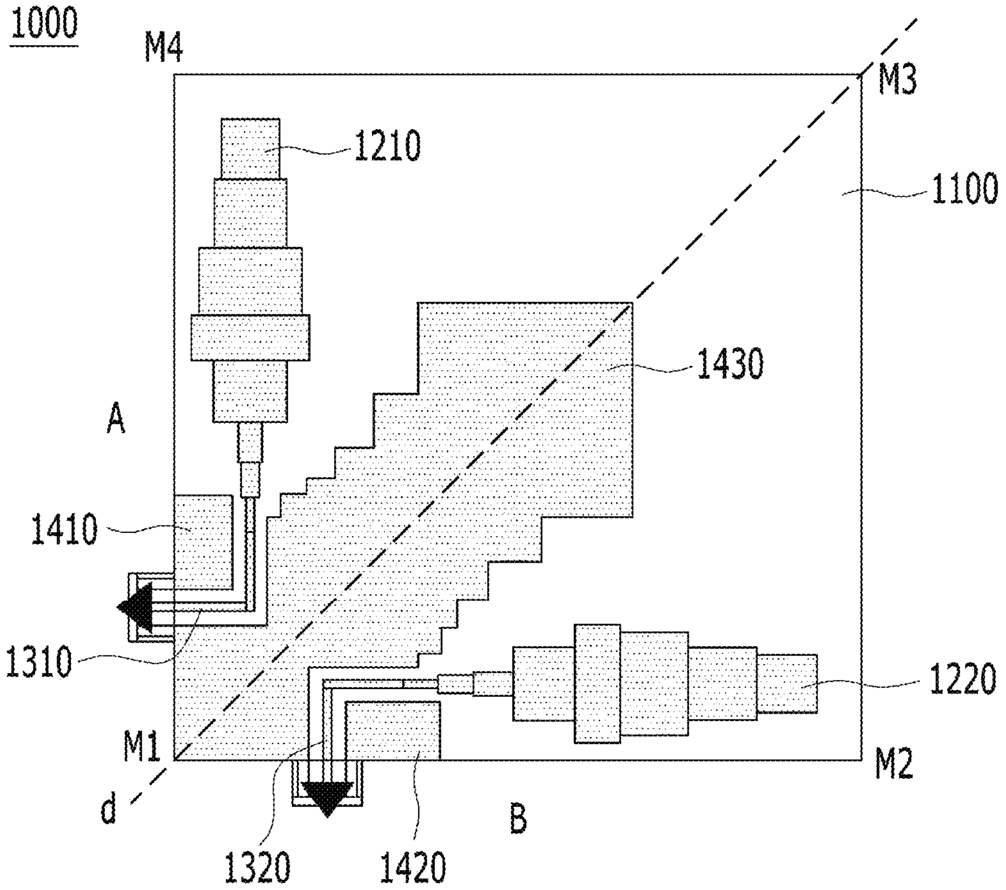
FIG. 15 is a diagram schematically illustrating a structure of an antenna according to embodiments.

FIG. 15 schematically illustrates a structure of an antenna according to embodiments.

An antenna 1000 according to embodiments transmits/receives data to/from the outside, as described in FIGS. 1 to 14. For example, the antenna 1000 provides an efficient method for radiation or reception in order to radiate or receive radio waves for data transmission and reception. Hereinafter, descriptions of the same or similar configurations and/or descriptions as described above will be omitted.

The antenna 1000 includes a substrate 1100, a radiating part (e.g., 1210 and 1220), a feeding line (e.g., 1310, 1320), and a ground part (e.g., 1410, 1420, and 1430). In this case, the radiating part includes, for example, a first radiating part 1210 and a second radiating part 1220. Also, the feeding line includes, for example, a first feeding line 1310 and a second feeding line 1320. The ground part includes, for example, a first ground part 1410, a second ground part 1420, and a shared ground part 1430.

The antenna 1000 provides a structure in which a length of the feeding line (e.g., 1310 and 1320) is relatively short to minimize the feeding loss. Also, the antenna 1000 provides a structure in which the radiating part (e.g., 1210 and 1220) is relatively large in order to increase efficiency bandwidth.

The substrate 1100 includes various shapes as described in FIG. 10 and FIG. 11. For example, when the substrate 1100 has a polygonal shape, the substrate 1100 includes one or more corner portions. In this case, the corner portion includes one or more corners. For example, the substrate 1100 may have a pentagonal shape including five corners. In this case, two corners of the substrate 1100 may be relatively concentrated. In this case, the substrate 1100 may include one corner portion including two corners and three corner portions including one corner, i.e., a total of four corner portions. Also, for example, when the substrate 1100 has a circular shape or a part thereof including a curved surface, the substrate 1100 includes one or more curved surfaces. The curved surface in the circular shape may correspond to the corner portion in the polygonal shape.

For convenience of description, hereinafter, as illustrated in FIG. 15, a case in which the substrate 1100 is a square will be described as an example. For example, the substrate 1100 has a size of 90 mm×90 mm. The substrate 1100 includes four corners M1, M2, M3, and M4. In this case, a dotted line d in FIG. 15 represents a diagonal line connecting the first corner M1 and the third corner M3 positioned in the direction opposite to the first corner M1.

The first radiating part 1210 is disposed close to a first surface A along the first surface A. The first radiating part 1210 is disposed long in a length direction of the first surface A. The first radiating part 1210 is formed long in a direction perpendicular to a second surface B. Accordingly, a size of the first radiating part 1210 is increased. Furthermore, the first radiating part 1210 may be connected to the first feeding line 1310 at a shorter distance than the embodiments described in FIGS. 10 to 14.

The second radiating part 1220 is disposed close to the second surface B along the second surface B. The second radiating part 1220 is disposed long in a length direction of the second surface B. The second radiating part 1220 is formed long in a direction perpendicular to the first surface A. Accordingly, a size of the second radiating part 1220 is increased. In addition, the second radiating part 1220 may be connected to the second feeding line 1320 at a shorter distance than the embodiments described in FIGS. 10 to 14.

Through the above structure, the antenna 1100 according to embodiments may increase a distance between the first radiating part 1210 and the second radiating part 1220. The antenna 1100 minimizes interference between the first radiating part 1210 and the second radiating part 1220.

Also, as the sizes of the first and second radiating parts 1210 and 1220 increase, the antenna 1000 according to embodiments allows a starting point of a bandwidth to move further in a low frequency direction. That is, the antenna 1000 according to embodiments provides a wider bandwidth.

Also, the first feeding line 1310 and the second feeding line 1320 have a shorter shape than the example described in FIGS. 10 to 14. That is, the antenna 1000 according to embodiments may minimize the feeding loss by shortening the feeding line.

Meanwhile, in the case of a high frequency band, a length of a wavelength decreases as a frequency increases. Accordingly, in order to provide a structure more suitable for resonance of a frequency in a high frequency band, a size of the ground part is required to be reduced. Accordingly, the first ground part 1410 is disposed in a reduced form on the side of the first surface A so as not to overlap with the first radiating part 1210. The second ground part 1420 is disposed in a reduced form on the side of the second surface B so as not to overlap with the second radiating part 1220. Through such a structure, the antenna 1100 provides a structure in which efficiency in a high frequency band is increased.

The shared ground part 1430 is disposed along a diagonal d of the substrate 1100. The first radiating part 1210 is disposed along the first surface A, the second radiating part 1220 is disposed along the second surface B, and the shared ground part 1430 is disposed along the diagonal d of the substrate 1100, so that the shared ground part 1430 is spaced apart from each of the first radiating part 1210 and the second radiating part 12200.

The antenna 1000 is formed in a symmetrical structure with respect to the diagonal d of the substrate 1100. In this case, the symmetrical structure includes not only the symmetry when it is physically completely the same, but also the case where the schematic disposition of each component included in the antenna 1000 is the same and/or similar. For example, with respect to the diagonal d of the substrate 1100, the first radiating part 1210 may be formed long along the first surface A and the second radiating part 1220 may be formed long along the second surface B. In this case, the positions of the protrusion of the first radiating part 1210 and the protrusion of the second radiating part 1220 may not be completely physically the same symmetrical positions with respect to the diagonal d of the substrate 1100. However, the "structure symmetrical with respect to the diagonal d of the substrate 1100" described in the present specification includes up to this case.

Accordingly, the antenna 1000 according to embodiments provides a method of efficiently disposing a plurality of radiating parts performing the same or similar functions.

Figure 16:
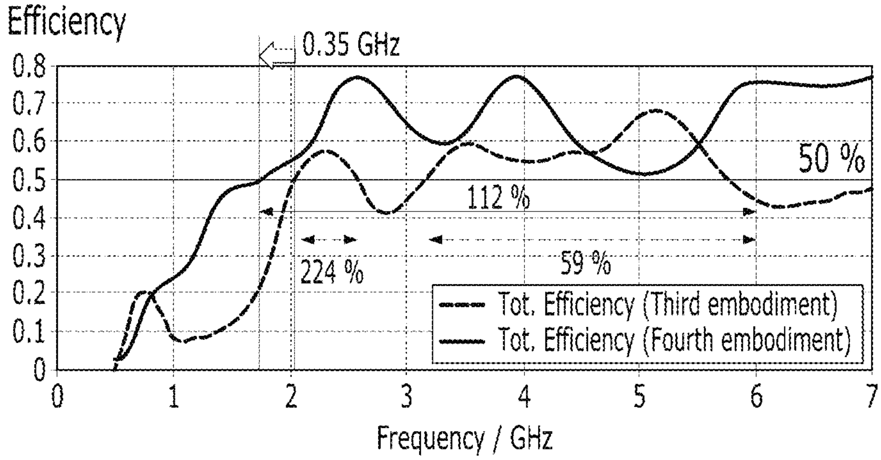
FIG. 16 is a graph of comparing technical effects of the embodiments described in FIG. 13 and FIG. 15.
Figure 16:
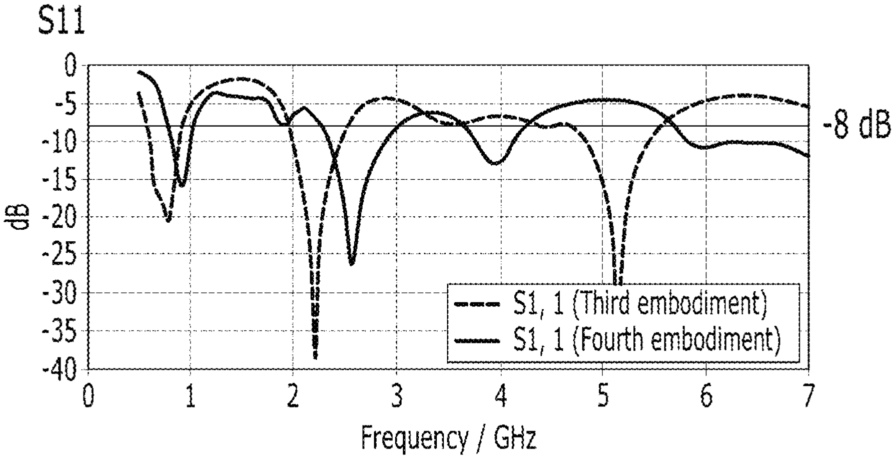

FIG. 16 is a graph of comparing technical effects of the embodiments described in FIG. 13 and FIG. 15.

For convenience of description, the structure of the antenna 1000 described in FIG. 13 is referred to as the third embodiment, and the structure of the antenna 1000 described in FIG. 15 is referred to as a fourth embodiment. In FIG. 16, a dotted line indicates the fourth embodiment. In FIG. 16, a solid line indicates the fourth embodiment. Hereinafter, descriptions of the same or similar configurations and/or descriptions as described above will be omitted.

FIG. 16(*a*) is a graph illustrating efficiency according to a frequency band. In FIG. 16(*a*), a horizontal axis represents a frequency band. In FIG. 16(*a*), a vertical axis represents radiation efficiency of an antenna.

In FIG. 16(*a*), an efficiency bandwidth is determined for 600 MHz to 6 GHZ. As shown in FIG. 16(*a*), the efficiency bandwidth of the third embodiment is about 81% in the full frequency band. Also, the efficiency bandwidth of the fourth embodiment is about 112% in the full frequency band. Accordingly, it may be seen that the efficiency bandwidth of the fourth embodiment is increased by about 31% in the full frequency band compared to the third embodiment.

In the third embodiment, a starting point of the bandwidth is about 2.05 GHZ. Also, in the fourth embodiment, a starting point of the bandwidth is about 1.70 GHZ. Accordingly, it may be seen that a range of the bandwidth capable of resonance in the fourth embodiment is wider than that in the third embodiment.

FIG. 16(*b*) is a graph showing redundancy according to a frequency band. In FIG. 16(*b*), a horizontal axis indicates a frequency band. In FIG. 16(*b*), a vertical axis indicates redundancy. It may be seen from FIG. 16(*b*) that multiple resonance points are formed in the fourth embodiment compared to the third embodiment.

As such, the antenna 1000 according to embodiments provides a method for reducing a length of feed and increasing a length of a radiation current for a low frequency. Accordingly, the antenna 1000 may increase efficiency according to the reduction of the feeding loss and allow a starting point of a bandwidth to move further toward the low frequency owing to the increase in a size of the radiating part.

Meanwhile, hereinafter, a structure of the antenna 1000 in which the efficiency of the antenna is further increased and an efficiency bandwidth and a bandwidth become wider will be described.

Figure 17:
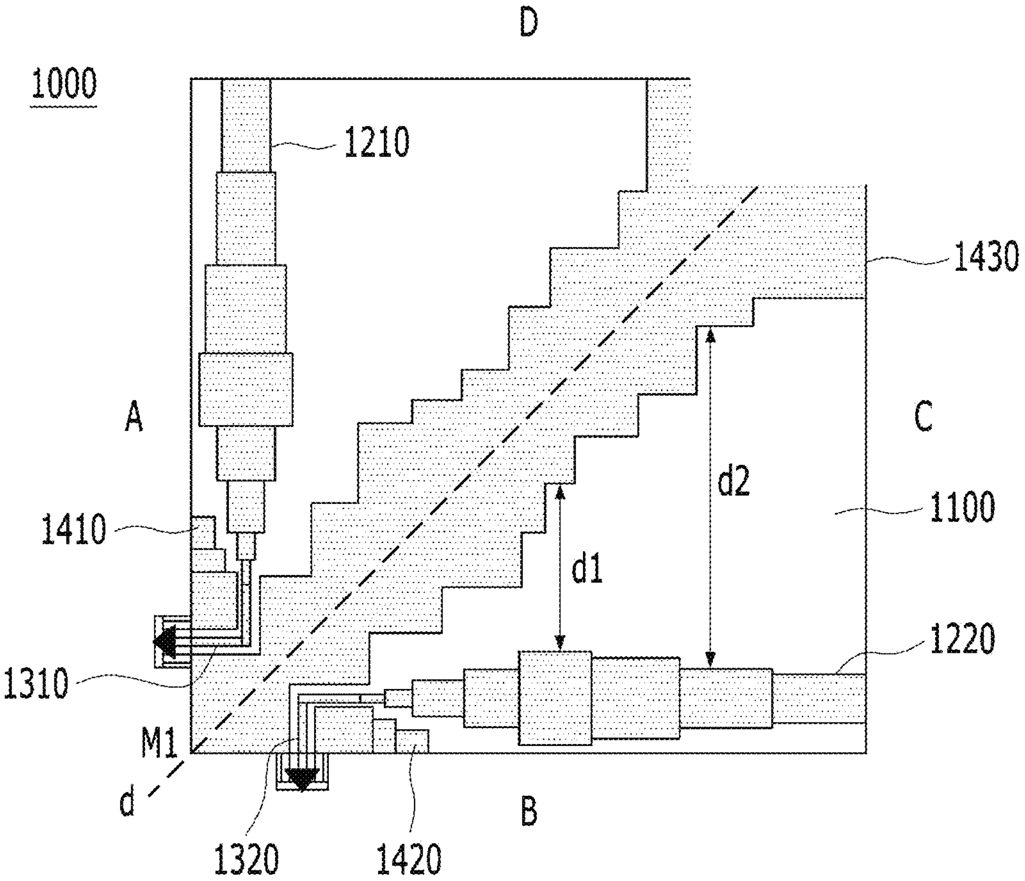
FIG. 17 is a diagram schematically illustrating a structure of an antenna according to embodiments.

FIG. 17 schematically illustrates a structure of an antenna according to embodiments.

An antenna 1000 according to embodiments transmits/receives data to/from the outside, as described in FIGS. 1 to 16. For example, the antenna 1000 provides an efficient method for radiation or reception in order to radiate or receive radio waves for data transmission and reception. Hereinafter, descriptions of the same or similar configurations and/or descriptions as described above will be omitted.

The antenna 1000 includes a substrate 1100, a radiating part (e.g., 1210 and 1220), a feeding line (e.g., 1310 and 1320), and a ground part (e.g., 1410, 1420, and 1430). In this case, the radiating part includes, for example, a first radiating part 1210 and a second radiating part 1220. Also, the feeding line includes, for example, a first feeding line 1310 and a second feeding line 1320. The ground part includes, for example, a first ground part 1410, a second ground part 1420, and a shared ground part 1430.

The antenna 1000 provides a method for increasing efficiency of an antenna and/or further moving a starting point of a frequency bandwidth toward a low frequency. For example, the antenna 1000 proposes a structure and/or disposition for increasing sizes of the radiating part (e.g., 1210 and 1220) and/or the ground part (e.g., 1410, 1420, and 1430).

The substrate 1100 is, for example, 120 mm×120 mm. That is, the substrate 1100 may have, for example, a substrate having a larger size than the substrate 1100 described in FIGS. 11 to 16.

The shared ground part 1430 is disposed along a diagonal d of the substrate 1100, which connects a first corner M1 to a third corner M3 facing the first corner M1. In this case, as a size of the substrate 1100 increases, an area of the shared ground part 1430 also increases. Meanwhile, the shared ground part 1430 is disposed from the first corner M1 to the third corner M3. That is, the area of the shared ground part 1430 occupied with respect to the substrate 1100 increases.

Meanwhile, in the case of a low frequency band, as a frequency decreases, a length of wavelength increases. Accordingly, it is required to increase the size of the ground part in order to provide a structure more suitable for the resonance of the frequency in the low frequency band. Accordingly, the antenna 1000 according to embodiments may increase the size of the shared ground part 1430, thereby increasing the efficiency for the low frequency band.

Also, in order to further increase such an effect, the first radiating part 1210 is formed to be elongated along a first surface A. For example, the first radiating part 1210 may be formed to be elongated to reach or approach a fourth surface D in a direction perpendicular to a second surface B. Accordingly, as described in FIG. 11, the first feeding line 1310 is connected through the first surface A to be formed along the first surface A. However, unlike the description in FIG. 11, a portion in which the first feeding line 1310 and the first radiating part 1210 are connected may also be formed along the first surface A.

Also, the second radiating part 1220 is formed to be elongated along the second surface B. For example, the second radiating part 1220 may be formed to be elongated to contact or approach a third surface C in a direction perpendicular to the first surface A. Accordingly, as described in FIG. 11, the second feeding line 1320 is connected through the second surface B to be formed along the second surface B. However, unlike the description in FIG. 11, a portion in which the second feeding line 1320 and the second radiating part 1220 are connected may also be formed along the second surface B.

In this case, the third surface C is a surface facing the first surface A, and is adjacent to the second surface B. The fourth surface D is a surface adjacent to the first surface A and the third surface C, and is a surface facing the second surface B.

Furthermore, in order to increase the above effect, the antenna 1000 according to embodiments proposes a structure in which the first ground part 1410 and the second ground part 1420 also increase in size.

For example, the first ground part 1410 is disposed not to overlap the first radiating part 1210 and the first feeding line 1310. In this case, the first ground part 1410 has one side contacting the first surface A or is formed close to the first surface A in order to be most efficiently disposed on the substrate 1100. Also, the first ground part 1410 has the other side formed to correspond to the first radiating part 1210 and/or the first feeding line 1310. For example, an uneven portion of the first ground part 1410 corresponds to an uneven portion of the first radiating part 1210 and/or the first feeding line 1310. For example, the other side of the first ground part 1410 has a stair shape. In this case, the other side of the first ground part 1410 is a surface of a side facing the first radiating part 1210 and/or the first feeding line 1310 in a boundary area of the first ground part 1410.

In addition, for example, the second ground part 1420 is disposed not to overlap the second radiating part 1220 and the second feeding line 1320. In this case, one side of the second ground part 1420 is formed to contact the second surface B or to be close to the second surface B in order to be most efficiently disposed on the substrate 1100. In addition, the second ground part 1420 is formed such that the other side thereof corresponds to the second radiating part 1220 and/or the second feeding line 1320. For example, an uneven portion of the second ground part 1420 corresponds to an uneven portion of the second radiating part 1220 and/or the second feeding line 1320. For example, the other side of the second ground part 1320 has a stair shape. In this case, the other side of the second ground part 1420 is a surface of a side facing the second radiating part 1220 and/or the second feeding line 1420 in a boundary area of the second ground part 1420.

In addition, the antenna 1000 according to embodiments provides a structure in which the shared ground part 1430 gradually moves away from each of the first and second radiating parts 1210 and 1220. For example, in the shared ground part 1430 formed from the first corner M1 toward the third corner M3, a shortest distance between the boundary area of the first radiating part 1210 and the boundary area of the shared ground part 1430 tends to become longer and longer as the first radiating part 1210 moves toward the fourth surface D. Also, for example, in the shared ground part 1430 formed from the first corner M1 toward the third corner M3, as the second radiating part 1220 moves toward the third surface C, a shortest distance between the boundary area of the second radiating part 1220 and the boundary area of the shared ground part 1430 tends to become longer and longer. For example, the second distance d2 is greater than the first distance d1.

In some areas, there may be an area in which the second distance is shorter than the first distance. That is, the antenna 1000 is disposed with such a tendency and is not necessarily formed in such a way. However, the antenna 1000 may further increase the radiation efficiency of the antenna by having such a tendency.

The antenna 1000 according to embodiments provides an antenna structure in which antenna efficiency and bandwidth are increased.

Figure 18:
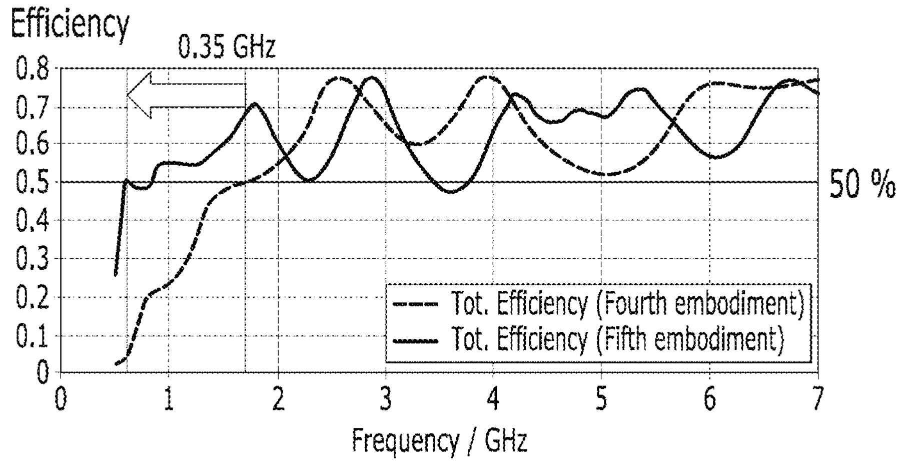
FIG. 18 is a graph of comparing technical effects of the embodiments described in FIG. 15 and FIG. 17.
Figure 18:
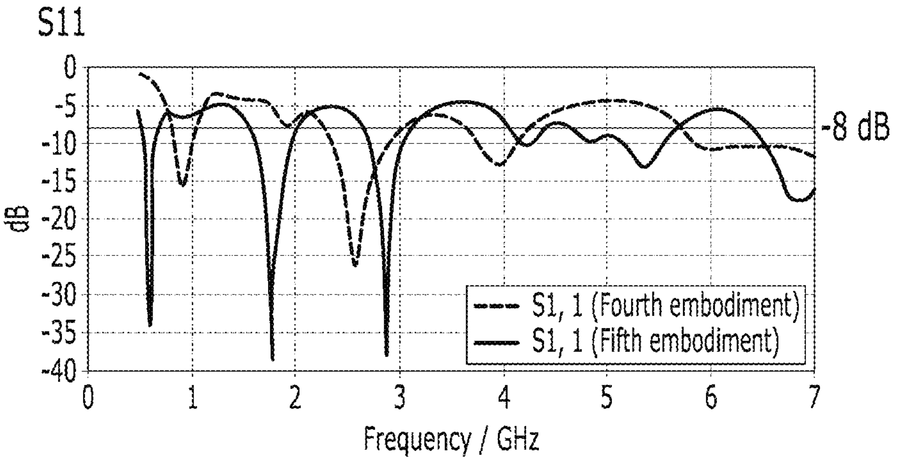

FIG. 18 is a graph of comparing technical effects of the embodiments described in FIG. 15 and FIG. 17.

For convenience of description, the structure of the antenna 1000 described in FIG. 15 is referred to as the fourth embodiment, and the structure of the antenna 1000 described in FIG. 17 is referred to as a fifth embodiment. In FIG. 18, a dotted line indicates the fourth embodiment. In FIG. 18, a solid line indicates the fifth embodiment. Hereinafter, descriptions of the same or similar configurations and/or descriptions as described above will be omitted.

FIG. 18(*a*) is a graph illustrating efficiency according to a frequency band. In FIG. 18(*a*), a horizontal axis represents a frequency band. In FIG. 18(*a*), a vertical axis represents radiation efficiency of an antenna.

In FIG. 18(*a*), an efficiency bandwidth is determined for 600M GHz to 6 GHZ. Referring to FIG. 18(*a*), it may be seen that the fifth embodiment has an antenna efficiency of more than 50% in a target full frequency bandwidth. That is, it may be seen that the fifth embodiment has an efficiency bandwidth for almost the full frequency bandwidth.

Meanwhile, in the fourth embodiment, the starting point of the bandwidth is about 1.70 GHz. Also, in the fifth embodiment, the starting point of the bandwidth is about 0.617 GHz. Accordingly, it may be seen that a range of a bandwidth capable of resonance in the fifth embodiment is wider than that in the fourth embodiment.

FIG. 18(*b*) is a graph showing redundancy according to a frequency band. In FIG. 18(*b*), horizontal axis indicates a frequency band. In FIG. 18(*b*), a vertical axis indicates redundancy. It may be seen from FIG. 18(*b*) that multiple resonance points are further formed in the fifth embodiment than in the fourth embodiment.

As such, the antenna 1000 according to embodiments provides a method for disposing the radiating part and the ground part to increase in size. Accordingly, the antenna 1000 provides an effect of further increasing the efficiency of the antenna and an effect of increasing the efficiency bandwidth and the bandwidth.

Hereinafter, a structure of the antenna 1000 in which impedance matching characteristics are further improved while maintaining the above characteristics will be described.

Figure 19:
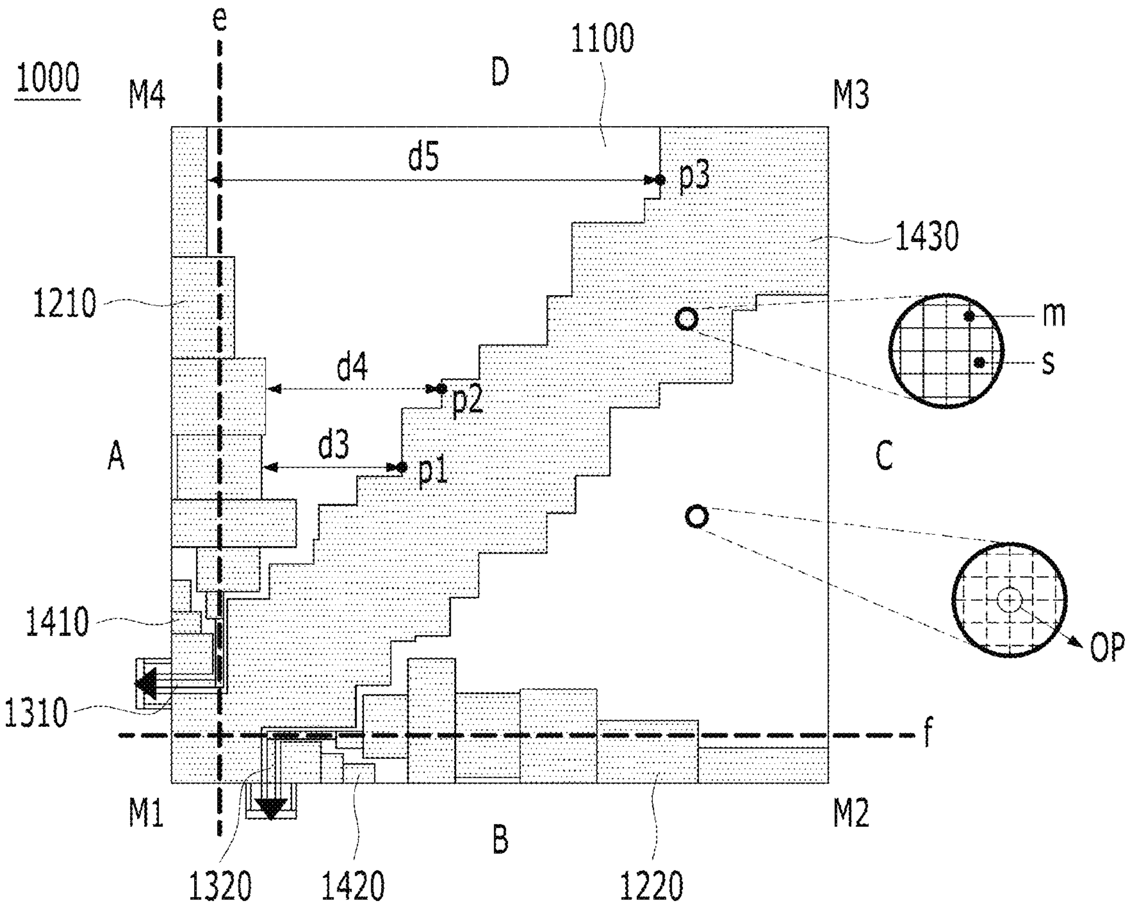
FIG. 19 is a diagram schematically illustrating a structure of an antenna according to embodiments.

FIG. 19 schematically illustrates a structure of an antenna according to embodiments.

An antenna 1000 according to embodiments transmits/receives data to/from the outside, as described in FIGS. 1 to 18. For example, the antenna 1000 provides an efficient method for radiation or reception in order to radiate or receive radio waves for data transmission and reception. Hereinafter, descriptions of the same or similar configurations and/or descriptions as described above will be omitted.

The antenna 1000 includes a substrate 1100, a radiating part (e.g., 1210 and 1220), a feeding line (e.g., 1310 and 1320), and a ground part (e.g., 1410, 1420, and 1430). In this case, the radiating part includes, for example, a first radiating part 1210 and a second radiating part 1220. Also, the feeding line includes, for example, a first feeding line 1310 and a second feeding line 1320. The ground part includes, for example, a first ground part 1410, a second ground part 1420, and a shared ground part 1430.

The antenna 1000 provides a method for increasing an impedance bandwidth. For example, the antenna 1000 proposes a structure and/or disposition in which the radiating part (e.g., 1210 and 1220) has an asymmetric structure.

For convenience of description, a portion at which the radiating part and the feeding line are connected is defined as a connection line. For example, the first feeding line 1310 includes a first connection line 1311. The first connection line 1311 is a portion of the first feeding line 1310 that is connected to the first radiating part 1210. Also, for example, the second feeding line 1320 includes a second connection line 1312. The second connection line 1312 is a portion of the second feeding line 1320 that is connected to the second radiating part 1220.

As described in FIGS. 15 to 18, the first feeding line 1310 is formed through the first surface A. After passing through the first surface A, the first feeding line 1310 is formed to be parallel to the first surface A along the first surface A. In this case, the first feeding line 1310 is not completely parallel to the first surface A and may have a predetermined inclination, some concave or curved portions, or some bent portions.

The first feeding line 1310 is formed to be parallel to the first surface A, and is connected to the first radiating part 1210 through the first connection line 1311. The first radiating part 1210 is formed in an asymmetric structure with respect to an extension line e of the first connection line 1311.

For example, the first radiating part 1210 is formed along the first surface A from a side of the second surface B toward a side of the fourth surface D. Preferably, the first radiating part 1210 is formed up to the fourth surface D to increase an area.

In this case, the first radiating part 1210 is formed in an asymmetric structure in a direction away from the shared ground part 1430 in order to widen a distance from the shared ground part 1430. For example, the first radiating part 1210 is formed to be close to a side of the first surface A side or to be in contact with the first surface A based on the extension line e of the first connection line 1311. For example, the first radiating part 1210 includes a shape inclined toward the first surface A based on the extension line e of the first connection line 1311.

Also, as described in FIGS. 15 to 18, the second feeding line 1320 is also formed through the second surface B. After passing through the second surface B, the second feeding line 1320 is formed to be parallel to the second surface B along the second surface B. In this case, the second feeding line 1320 may not be completely parallel to the second surface B and may have a predetermined inclination, some concave or curved portions, or some bent portions.

The second feeding line 1320 is formed to be parallel to the second surface B, and is connected to the second radiating part 1220 through the second connection line 1312. The second radiating part 1220 is formed in an asymmetric structure with respect to an extension line f of the second connection line 1312.

For example, the second radiating part 1220 is formed along the second surface B from the side of the first surface A to the side of the third surface C. Preferably, the second radiating part 1220 is formed up to the third surface C to increase an area.

In this case, like the first radiating part 1210, the second radiating part 1220 is also formed in an asymmetric structure in a direction away from the shared ground part 1430 to widen a distance from the shared ground part 1430. For example, the second radiating part 1220 is formed to be close to the side of the second surface B or to be in contact with the second surface B based on the extension line f of the second connection line 1312. For example, the second radiating part 1220 includes a shape protruding toward the second surface B based on the extension line f of the second connection line 1312.

In this case, the extension line of the connection line is formed based on the point at which the connection line and the radiating part are connected. For example, the radiating part (e.g., 1210 and 1220) has a structure other than a symmetrical structure. For example, the radiating part (e.g., 1210 and 1220) includes a structure in which a more antenna pattern (e.g., 'm' described below) is formed on the substrate 1100 on a far side from the shared ground part 1430 and a less antenna pattern m is formed on a side closer to the shared ground part 1430.

According to the above structure, as described below, the shared ground part 1430 and the first and second radiating parts 1210 and 1220 may secure a greater distance from each other.

For example, a boundary area of the shared ground part 1430 includes a first point p1, a second point p2, and a third point p3. Also, the first point p1, the second point p2, and the third point p3 are formed along one surface of the shared ground part 1430 located on a side that faces the first radiating part 1210 in the boundary area of the shared ground part 1430. The first point p1, the second point p2, and the third point p3 are arbitrary points located on one surface located on the side facing the first radiating part 1210. The first point p1 is closer to a first corner M1 than the second point p2. Also, the second point p2 is closer to the first corner M1 than the third point p3.

A vertical distance from the first point p1 to the first radiating part 1210 is referred to as a first distance d3. Also, a vertical distance from the second point p2 to the first radiating part 1210 is referred to as a second distance d4. Also, a vertical distance from the third point p3 to the first radiating part 1210 is referred to as a third distance d5. In this case, the first distance d3 is shorter than the second distance d4. Also, the second distance d4 is shorter than the third distance d5.

As such, the antenna 1000 according to the embodiments provides a method of further increasing a distance between the radiating part and the ground part. Through this, the antenna 1000 radiates an E-field generated by the out-of-phase of a surface current. The antenna 1000 increases the distance between the radiating part and the ground part so that an electric field is formed owing to a main current, which is the out-of-phase between the radiating part and the ground part. The antenna 1000 decreases a static E-field point remaining without being radiated. That is, the antenna 1000 according to the embodiments increases an impedance imaginary part and improves impedance matching characteristics.

Meanwhile, in FIG. 19, 'm' is an example in which an antenna pattern is formed on the substrate 1100. The antenna pattern m is a pattern formed on the substrate 1100. The antenna pattern m includes, for example, the radiating part (e.g., 1210 and 1220), the feeding line (e.g., 1310 and 1320), and the radiating part (e.g., 1410, 1420, and 1430), which are described in FIGS. 1 to 19.

The antenna pattern m according to embodiments is formed of, for example, a metal wire. The antenna pattern m is formed in the form of a mesh, for example. Accordingly, the antenna 1000 may be provided by forming a metal mesh m on the substrate 1100. In this case, an area in which the metal mesh m is not formed on the substrate 1100 is denoted by 's' in FIG. 19.

Meanwhile, in FIG. 19, 'op' represents an open point. The antenna 1000 according to embodiments includes an area in which an antenna pattern is formed and an area in which an antenna pattern is not formed. In this case, the area in which the antenna pattern is not formed is a dummy metal mesh, and includes, for example, an open point op.

As such, the antenna 1000 according to embodiments proposes a structure capable of further increasing a spaced distance between the radiating part and the ground part. Accordingly, embodiments may secure an impedance bandwidth by improving impedance matching characteristics.

Figure 20:
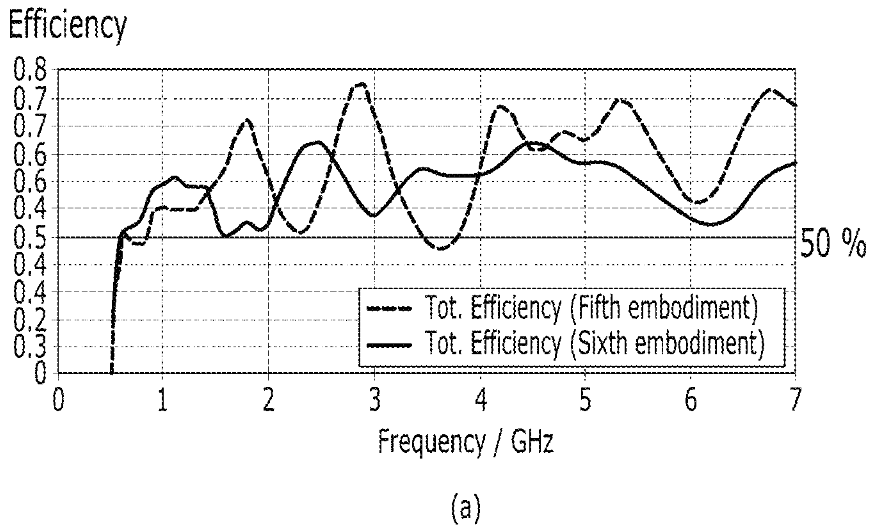
FIG. 20 is a graph of comparing technical effects of the embodiments described in FIG. 17 and FIG. 19.
Figure 20:
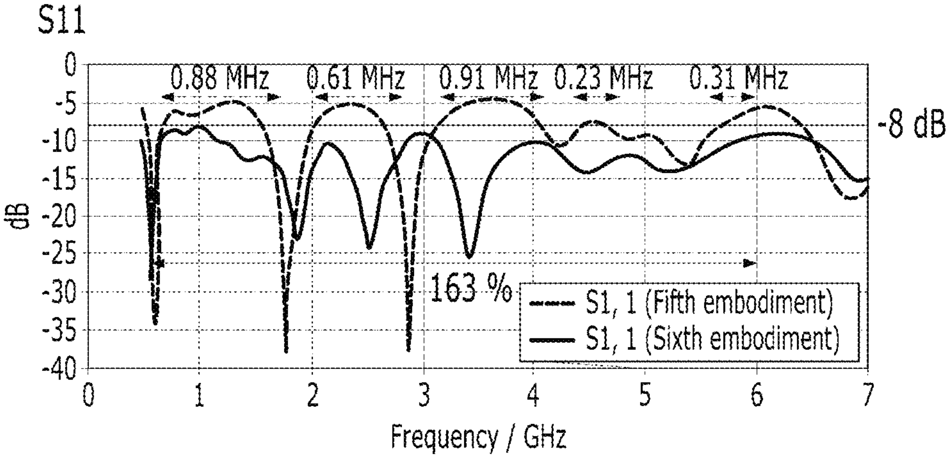

FIG. 20 is a graph of comparing technical effects of the embodiments described in FIG. 17 and FIG. 19.

For convenience of description, the structure of the antenna 1000 described in FIG. 17 is referred to as the fifth embodiment, and the structure of the antenna 1000 described in FIG. 19 is referred to as a sixth embodiment. In FIG. 20, a dotted line indicates the fifth embodiment. In FIG. 20, a solid line indicates the sixth embodiment. Hereinafter, descriptions of the same or similar configurations and/or descriptions as described above will be omitted.

FIG. 20(*a*) is a graph showing efficiency according to a frequency band. In FIG. 20(*a*), a horizontal axis represents a frequency band. In FIG. 20(*a*), a vertical axis represents radiation efficiency of the antenna. As shown in FIG. 20(*a*), it may be seen that both the fifth and sixth embodiments have antenna efficiency of 50% or more in a wideband width.

FIG. 20(*b*) is a graph showing redundancy according to a frequency band. In FIG. 20(*b*), a horizontal axis represents a frequency band. In FIG. 20(*b*), a vertical axis represents redundancy. It may be seen from FIG. 20(*b*) that a bandwidth of antenna impedance in the sixth embodiment is secured by about 163% or more.

As such, the antenna 1000 according to embodiments provides a direction in which a distance between the ground part and the radiating part is further increased. Accordingly, the antenna 1000 provides an effect of improving impedance matching characteristics by increasing an imaginary part of impedance while having excellent antenna efficiency.

As such, the antenna 1000 according to embodiments increases space utilization so as to be applicable to a rear quarter glass (e.g., '2010' described in FIG. 21) of a vehicle. Also, the antenna 1000 improves an antenna efficiency bandwidth by using a radiating part having multiple resonance points. Also, the antenna 1000 reduces the length of the feeding line (e.g., 1310 and 1320) through the structures described above in FIGS. 10 to 20, thereby improving feeding loss and radiation efficiency. Also, the antenna 1000 improves impedance matching characteristics by increasing an impedance imaginary part in a manner of spacing the radiating part and the ground part apart from each other.

Hereinafter, examples in which the antenna 1000 according to the embodiments described in FIGS. 10 to 20 is provided to a vehicle 2000 (e.g., the vehicle 100 described in FIGS. 1 to 20) will be described.

Figure 21:
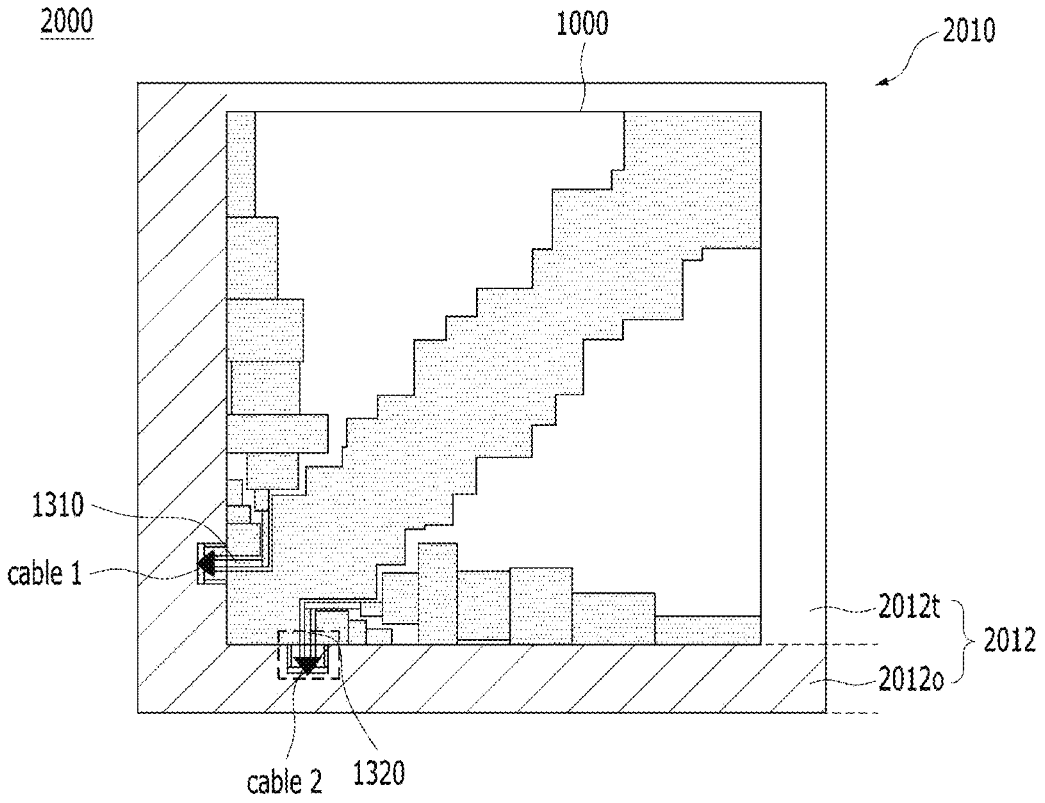
FIG. 21 is a diagram schematically illustrating a vehicle including an antenna according to embodiments.

FIG. 21 schematically illustrates a vehicle including an antenna according to embodiments.

In FIG. 21, '2000' represents a vehicle. For example, the vehicle 2000 includes the vehicle 100 described in FIGS. 1 to 20. In addition, in FIG. 21, '2010' represents a quarter glass. The quarter glass 2010 includes the reference numbers 140*a* to 140*c* described in FIG. 9B. In addition, in FIG. 21, '2012*t*' represents a transparent area in a glass 2012 of a quarter glass 2010, and '2012*o*' represents an opaque area in the glass 2012 of the quarter glass 2010.

As illustrated in FIG. 21, the vehicle 2000 includes a glass 2012 constituting a window and an antenna 1000 formed on the glass 2102. In this case, the antenna 1000 is embedded in the glass 2012 or disposed on an upper surface or a lower surface of the glass 2012.

The antenna 1000 is provided, for example, in the transparent area 2012*t* of the quarter glass. As described in FIGS. 10 to 20, for example, the antenna 1000 includes a transparent substrate 1100. Accordingly, the antenna 1000 according to embodiments may provide excellent appearance and effect even when used by being attached to the transparent quarter glass 2010.

In this case, a feeding line included in the antenna 1000 is connected to a cable embedded in the vehicle 2000. For example, a first feeding line 1310 is electrically connected to a first cable (cable 1). Also, for example, a second feeding line 1320 is electrically connected to a second cable (cable 2). Accordingly, the antenna 1000 is electrically connected to the vehicle 2000. The first cable (cable 1) and/or the second cable (cable 2) is, for example, a coaxial cable.

The first cable (cable 1) and/or the second cable (cable 2) is provided, for example, in the opaque area 20120 of the quarter glass. In this case, the opaque area 20120 of the quarter glass allows some light transmission, but includes an area close to opaque. The opaque area 20120 of the quarter glass is an area formed close to a window frame 2011 (see FIG. 22) of the vehicle 2000, for example. The opaque area 20120 of the quarter glass is an area formed to be opaque, for example, for tanning or aesthetics. For example, when the first cable (cable 1) and/or the second cable 2 (cable 2) are disposed on the substrate, the corresponding substrate may be an opaque substrate, for example, an FPCB.

Thus, embodiments provide transparent components for portions where transparency is required and opaque components for portions where opacity is required. In this way, embodiments efficiently provide components.

Hereinafter, in an antenna disposed on a glass of a vehicle, a position where the antenna is provided will be described in more detail.

Figure 22:
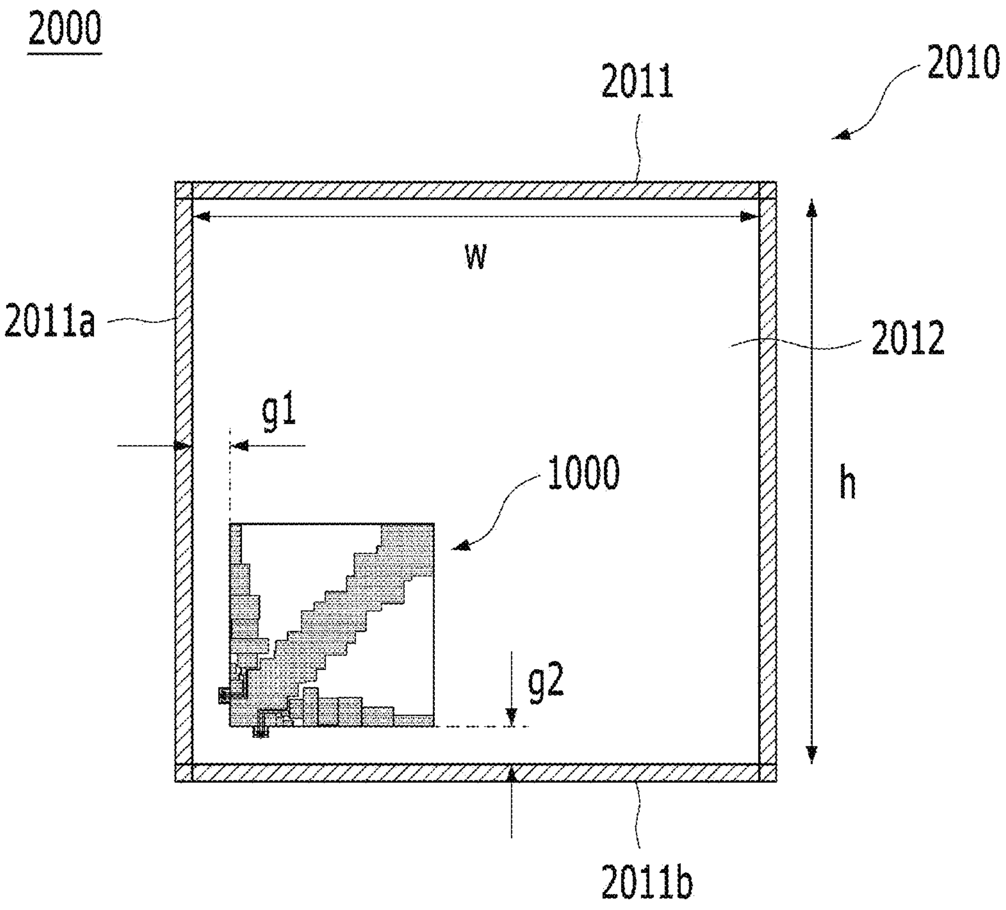
FIG. 22 is a diagram schematically illustrating an antenna provided structure in a vehicle according to embodiments.

FIG. 22 schematically illustrates a structure in which an antenna is provided in a vehicle according to embodiments.

For convenience of description, a case in which a frame 2011 and an antenna 1000 have rectangular shapes will be described as an example. Yet, the shapes thereof are not limited thereto.

As described above, a vehicle 2000 includes a quarter glass 2010. The quarter glass 2010 includes a glass 2012 and a frame 2011 that mounts and/or supports the glass 2012 thereon. The antenna 1000 according to embodiments is provided on the glass 2012. Accordingly, the vehicle 2000 may perform wireless communication via the antenna 1000.

The frame 2011 allows the glass 2012 to be fixed to the vehicle 2000. In addition, the frame 2011 forms and supports a shape of the vehicle 2000. In addition, when the vehicle 2000 is externally impacted, the frame 2011 should be sufficiently strong and absorb the impact to protect the occupants of the vehicle 2000. To this end, the frame 2011 includes, for example, a metal material.

However, as described later in FIG. 23, if a metal is included in the frame 2011, the efficiency of the antenna 1000 may be reduced. For example, when the frame 2011 including the metal and the antenna 1000 are in contact or disposed closer than necessary, antenna efficiency may be reduced. To prevent this, in the antenna 1000 according to embodiments, at least one side of the antenna 1000 is disposed to be spaced apart from the frame 2011 by a preset distance.

For example, the antenna 1000 is disposed to be spaced apart by a first gap g1 from one side of the antenna 1000 to a nearest frame 2011*a*. Also, for example, the antenna 1000 is disposed to be spaced apart by a second gap g2 from the other side of the antenna 1000 to a nearest frame 2011*b*. In this case, the first gap g1 and the second gap g2 are the same or different.

Through the above structure, the vehicle 2000 according to embodiments may dispose the frame 2011 including the metal and the antenna 1000 together without reducing the efficiency of the antenna 1000. That is, embodiments provide a method of securing a sufficient efficiency bandwidth even when the frame 2011 includes the metal.

Meanwhile, in the vehicle 2000 according to embodiments, the glass 2012 may be fully used as a ground part of the antenna 1000. Accordingly, embodiments provide a vehicle including an antenna with further increased antenna efficiency.

Figure 23:
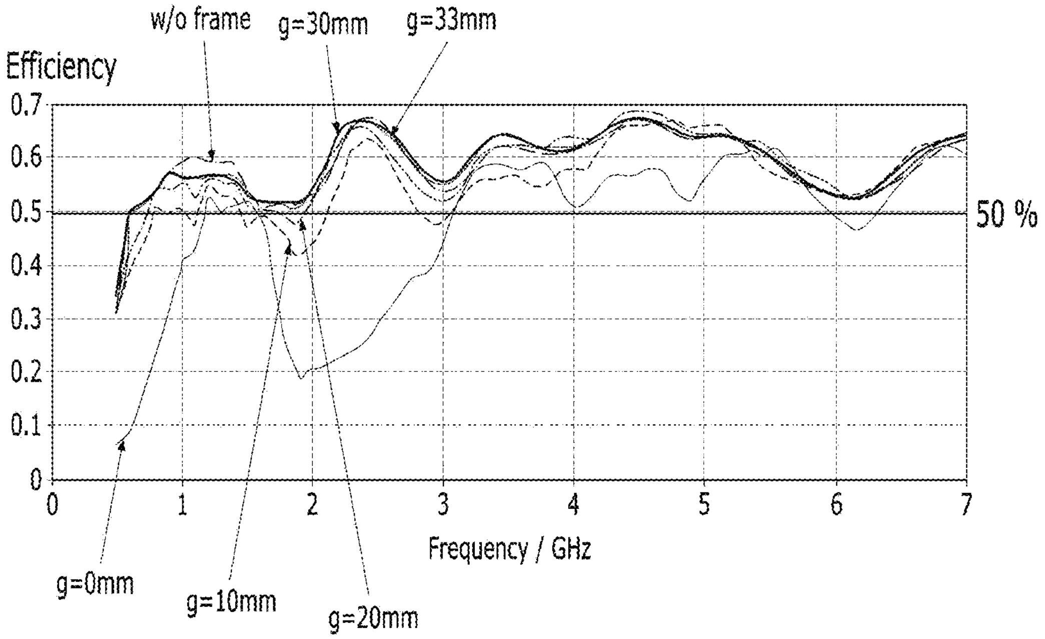
FIG. 23 is a graph showing a technical effect on a preset distance described in FIG. 22.

FIG. 23 is a graph showing a technical effect on the preset distance described in FIG. 22.

FIG. 23 is a graph showing antenna efficiency for each frequency by spacing the antenna 1000 according to embodiments apart from the frame 2011 described in FIG. 22. Shown in FIG. 23 is antenna efficiency when the frame 2011 is absent (w/o frame), when the antenna 1000 is not spaced apart from the frame 2011 (g=0 mm), when the antenna 1000 is spaced apart from the frame 2011 by 10 mm (g=10 mm), when the antenna 1000 is spaced apart from the frame 2011 by 20 mm (g=20 mm), when the antenna 1000 is spaced apart from the frame 2011 by 30 mm (g=30 mm), or when the antenna 1000 is spaced apart from the frame 2011 by 33 mm (g=33 mm).

A preset distance described through 'g' in FIG. 23 is the preset distance described in FIG. 22, and includes, for example, 'g1' and 'g2' in FIG. 22.

In order to determine an appropriate value of the preset distance in FIG. 23, the antenna 1000 is the antenna described in FIG. 19 and the sixth embodiment described in FIG. 20 is used. Moreover, in FIG. 23, the case in which the frame 2011 is 400 mm×400 mm is used as an example.

The vehicle 2000 includes the frame 2011 for maintaining the shape. In addition, the frame 2011 includes a metal material to absorb an impact from the outside while maintaining rigidity. As illustrated in FIG. 23, compared with the case in which there is no frame 2011 (w/o frame), it may be seen that the efficiency is generally degraded when there is the frame 2011. For example, as shown in FIG. 23, when there is the frame 2011 but the antenna 1000 is not spaced apart from the frame 2011 (g=0 mm), it may be seen that the full frequency bandwidth is reduced by about 99%.

Accordingly, in the vehicle 2000 according to embodiments, the antenna 1000 is disposed so that at least one side of the antenna 1000 is spaced apart from the frame 2011 by a preset distance or more.

In this case, when the antenna 1000 is installed in a manner of being spaced apart from the frame 2011 by a preset distance, the antenna efficiency varies depending on a spaced distance. In this case, as shown in FIG. 23, when the antenna 1000 is spaced apart from the frame 2011 by 33 mm (g=33 mm) through an experiment, it may be seen that the efficiency bandwidth is secured by about 163%, which is the most efficient.

For example, when a horizontal length w and a vertical length h in FIG. 22 are 400 mm each, the efficiency bandwidth is most efficient when each of the first gap g1 and the second gap g2 is 33 mm.

FIG. 23 is a graph showing a technical effect on the preset distance described in FIG. 22.

FIG. 23 is a graph showing antenna efficiency for each frequency by spacing the antenna 1000 according to embodiments apart from the frame 2011 described in FIG. 22. Shown in FIG. 23 is antenna efficiency when the frame 2011 is absent (w/o frame), when the antenna 1000 is not spaced apart from the frame 2011 (g=0 mm), when the antenna 1000 is spaced apart from the frame 2011 by 10 mm (g=10 mm), when the antenna 1000 is spaced apart from the frame 2011 by 20 mm (g=20 mm), when the antenna 1000 is spaced apart from the frame 2011 by 30 mm (g=30 mm), or when the antenna 1000 is spaced apart from the frame 2011 by 33 mm (g=33 mm).

A preset distance described through 'g' in FIG. 23 is the preset distance described in FIG. 22, and includes, for example, 'g1' and 'g2' in FIG. 22.

In order to determine an appropriate value of the preset distance in FIG. 23, the antenna 1000 is the antenna described in FIG. 19 and the sixth embodiment described in FIG. 20 is used. Moreover, in FIG. 23, the case in which the frame 2011 is 400 mm×400 mm is used as an example.

The vehicle 2000 includes the frame 2011 for maintaining the shape. In addition, the frame 2011 includes a metal material to absorb an impact from the outside while maintaining rigidity. As illustrated in FIG. 23, compared with the case in which there is no frame 2011 (w/o frame), it may be seen that the efficiency is generally degraded when there is the frame 2011. For example, as shown in FIG. 23, when there is the frame 2011 but the antenna 1000 is not spaced apart from the frame 2011 (g=0 mm), it may be seen that the full frequency bandwidth is reduced by about 99%.

Accordingly, in the vehicle 2000 according to embodiments, the antenna 1000 is disposed so that at least one side of the antenna 1000 is spaced apart from the frame 2011 by a preset distance or more.

In this case, when the antenna 1000 is installed in a manner of being spaced apart from the frame 2011 by a preset distance, the antenna efficiency varies depending on a spaced distance. In this case, as shown in FIG. 23, when the antenna 1000 is spaced apart from the frame 2011 by 33 mm (g=33 mm) through an experiment, it may be seen that the efficiency bandwidth is secured by about 163%, which is the most efficient.

For example, when a horizontal length w and a vertical length h in FIG. 22 are 400 mm each, the efficiency bandwidth is most efficient when each of the first gap g1 and the second gap g2 is 33 mm.

Meanwhile, each of the first feeding line 1310 and/or the second feeding line 1320 has a length equal to or smaller than a preset length. Accordingly, feed is prevented from being lost while moving along the feeding line. In the present specification, an antenna structure for efficiently arranging a space while preventing such feeding loss has been described with reference to FIGS. 10 to 23.

An antenna and/or a vehicle including the same according to embodiments of the present disclosure has been described above as a specific embodiment, but this is merely exemplary, and the present disclosure is not limited thereto, and should be construed as having the broadest scope according to the basic idea disclosed in the present specification.

Those skilled in the art may combine and replace the disclosed embodiments to implement an undisclosed embodiment, but this also does not deviate from the scope of rights of the present disclosure. In addition, those skilled in the art may easily change or modify the embodiments disclosed based on the present specification, and it is clear that such changes or modifications also fall within the scope of rights of the present disclosure.

INDUSTRIAL APPLICABILITY

An antenna and/or vehicle according to embodiments have industrial applicability.

What is claimed is:

1. An antenna, comprising:
- a substrate having a square shape including first to fourth corners;
- a radiating part disposed on the substrate and including a first radiating part and a second radiating part for radiating a wireless signal;
- a first feeding line for applying the wireless signal to the first radiating part and having a first extension line;
- a second feeding line for applying the wireless signal to the second radiating part and having a second extension line vertically intersecting with the first extension line; and
- a ground part disposed on the substrate by being spaced apart from the radiating part and having at least a portion of a boundary area in a stair shape, the ground part comprising a shared ground part disposed along a diagonal from the first corner to the third corner, located between the first radiating part and the second radiating part, and performing impedance matching of the first radiating part and the second radiating part,
- wherein the first radiating part is disposed perpendicular to the second radiating part with the shared ground part in between.

2. The antenna of claim 1, wherein the substrate has the square shape including the first to fourth corners and wherein the antenna is formed in a symmetrical structure with respect to the diagonal from the first corner toward the third corner facing the first corner.

3. The antenna of claim 1, wherein a boundary area of the shared ground part comprises first to third points formed along one surface located on a side facing the first radiating part, wherein the first point is closer to the first corner than the second point, wherein the second point is closer to the first corner than the third point, wherein a first distance being a vertical distance from the first point to the first radiating part is shorter than a second distance being a vertical distance from the second point to the first radiating part, and wherein the second distance is shorter than a third distance being a vertical distance from the third point to the first radiating part.

4. The antenna of claim 1, the ground part further comprising:
- a first ground part disposed adjacent to the first radiating part and performing the impedance matching of the first radiating part; and
- a second ground part disposed adjacent to the second radiating part and performing the impedance matching of the second radiating part.

5. The antenna of claim 1, wherein the radiating part comprises one or more protrusions in a boundary area.

6. The antenna of claim 1, wherein the first feeding line comprises a first connection line connected to the first radiating part, wherein the second feeding line comprises a second connection line connected to the second radiating part, wherein the first radiating part is formed in an asymmetrical structure with respect to an extension line of the first connection line, and wherein the second radiating part is formed in an asymmetric structure with respect to an extension line of the second connection line.

7. The antenna of claim 1, wherein a length of each of the first feeding line and the second feeding line is equal to or smaller than a preset length.

8. A vehicle, comprising:
- a glass constituting a window; and
- an antenna formed on the glass, the antenna comprising:
  - a substrate having a square shape including first to fourth corners;
  - a radiating part disposed on the substrate and including a first radiating part and a second radiating part for radiating a wireless signal;
  - a first feeding line for applying the wireless signal to the first radiating part and having a first extension line;
  - a second feeding line for applying the wireless signal to the second radiating part and having a second extension line vertically intersecting with the first extension line; and
  - a ground part disposed on the substrate by being spaced apart from the radiating part and having at least a portion of a boundary area in a stair shape, the ground part comprising a shared ground part disposed along a diagonal from the first corner to the third corner, located between the first radiating part and the second radiating part, and performing impedance matching of the first radiating part and the second radiating part,
- wherein the first radiating part is disposed perpendicular to the second radiating part with the shared ground part in between.

9. The vehicle of claim 8, wherein the vehicle further comprises a frame supporting the glass, wherein at least one side of the antenna is spaced apart from the frame by a preset distance.

* * * * *